US007664666B2

(12) United States Patent (10) Patent No.: US 7,664,666 B2
Barnard et al. (45) Date of Patent: *Feb. 16, 2010

(54) SYSTEM AND METHOD FOR ONGOING SUPPORTING A PROCUREMENT AND ACCOUNTS PAYABLE SYSTEM

(75) Inventors: Ray F. Barnard, Bonita Springs, FL (US); Philip J. Cirulli, Simpsonville, SC (US); Kerin J. Flannery, Endicott, NY (US); Carl J. Lanuti, Endwell, NY (US); Lawrence R. Maier, Johnson City, NY (US); Ann K. Walla, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 41 days.

This patent is subject to a terminal disclaimer.

(21) Appl. No.: 12/077,042

(22) Filed: Mar. 14, 2008

(65) Prior Publication Data

US 2008/0167927 A1 Jul. 10, 2008

Related U.S. Application Data

(60) Continuation of application No. 11/496,698, filed on Jul. 31, 2006, now Pat. No. 7,403,903, which is a division of application No. 10/727,443, filed on Dec. 3, 2003, now Pat. No. 7,143,053, which is a division of application No. 09/444,256, filed on Nov. 22, 1999, now Pat. No. 6,738,746.

(51) Int. Cl.
*G06F 17/50* (2006.01)

(52) U.S. Cl. .................................................. 705/7

(58) Field of Classification Search ................. 705/7–9, 705/10
See application file for complete search history.

(56) References Cited

U.S. PATENT DOCUMENTS

| 4,862,376 | A | 8/1989 | Ferriter et al. | 364/468 |
| 4,875,162 | A | 10/1989 | Ferriter et al. | 364/401 |
| 5,189,606 | A | 2/1993 | Burns et al. | 364/401 |
| 5,224,034 | A | 6/1993 | Katz et al. | 364/401 |

(Continued)

FOREIGN PATENT DOCUMENTS

EP 0 895 171 A2 2/1999

OTHER PUBLICATIONS

Sneed, Harry M. "Planning the Reengineering of Legacy Systems." IEEE Software, pp. 24-34, Jan. 1995.*

(Continued)

*Primary Examiner*—Susanna M Diaz
(74) *Attorney, Agent, or Firm*—Schmeiser, Olsen & Watts; William E. Schiesser

(57) ABSTRACT

A system for deploying to a client accounting installation a general procurement and accounts payable application specifically configured for the client by an enterprise includes a database server for (1) maintaining on a storage device a database of templates describing procedures for assessing, preparing, developing, deploying and supporting the application, and for (2) serving these templates to team members operating web-enabled terminals for coordinating, recording and tracking team activities with respect to the application while generating a description for adapting a front end server and an accounting system server to the requirements of the client.

2 Claims, 18 Drawing Sheets

U.S. PATENT DOCUMENTS

| | | | | |
|---|---|---|---|---|
| 5,233,513 | A | 8/1993 | Doyle | 354/401 |
| 5,283,745 | A | 2/1994 | Tanaka | 364/468 |
| 5,287,267 | A | 2/1994 | Jayaraman et al. | 364/403 |
| 5,315,509 | A | 5/1994 | Natarajan | 364/401 |
| 5,365,425 | A | 11/1994 | Torma et al. | 364/401 |
| 5,381,332 | A | 1/1995 | Wood | 364/401 |
| 5,450,317 | A | 9/1995 | Lu et al. | 364/402 |
| 5,737,727 | A | 4/1998 | Lehmann et al. | 705/7 |
| 5,745,880 | A * | 4/1998 | Strothmann | 705/7 |
| 5,793,632 | A | 8/1998 | Fad et al. | 364/464.1 |
| 5,848,394 | A | 12/1998 | D'Arrigo et al. | 705/8 |
| 6,318,610 | B1 | 4/2002 | Gundewar | 707/104 |
| 6,381,610 | B1 | 4/2002 | Gundewar et al. | |
| 7,020,621 | B1 * | 3/2006 | Feria et al. | 705/10 |
| 2002/0007298 | A1 * | 1/2002 | Jim et al. | 705/9 |

OTHER PUBLICATIONS

Anonymous, RD 417032, "On-line IP portfolio management and advice . . . ", Derwent Info Ltd., Dialog File 351:Derwent WPI data base printout, Abstract, Jan. 10, 1999.

Noori, Hamid and Russell Radford, *Production and Operations Management Total Quality and Responsiveness*, Chapter 12 "Project Management", New York, McGraw-Hill, Inc. 1995, 377-416.

"SAP Offers End-User Training Products and Consulting Services, Further Its TeamSAP Commitment to Customers." Business Wire, Sep. 14, 1998.

Stevens, Tim. "Proof Positive." Industry Week, vol. 247,No. 15, pp. 22-28, Aug. 17, 1998.

"SAP Announces SAP Focus Initiative to Deliver First Solution For Complete Customer Relationship Life Cycle." Business Wire, Sep. 14, 1998.

Norris, et al. "SAP An Executive's Comprehensive Guide." Chapter 20. New York, NY. John Wiley & Sons, 1998. 237-245.

Feurer et al. "Performance Measurement in Strategic Change," Benchmarking for Quality Management & Technology, vol. 2, No. 2, p. 64, 1995. pp.1-10 of 11.

Davis et al. "The Information System Consultant's Handbook: Systems Analysis and Design." CRC Press, Dec. 1, 1998.

Office Action (Mail Date Jun. 24, 2009) for U.S. Appl. No. 12/012,464, filed Feb. 2, 2008, Confirmation No. 3756.

* cited by examiner

SYSTEM AND METHOD FOR ONGOING SUPPORTING A PROCUREMENT AND ACCOUNTS PAYABLE SYSTEM

CROSS REFERENCES TO RELATED APPLICATIONS

This application is a continuation of Ser. No. 11/496,698, filed 31 Jul. 2006, now U.S. Pat. no. 7,403,903 which is a divisional of U.S. patent application Ser. No. 10/727,443, filed 3 Dec. 2003, now U.S. Pat. No. 7,143,053 which is a divisional of U.S. patent application Ser. No. 09/444,256 filed 22 Nov. 1999, now U.S. Pat. No. 6,738,746 all by R. F. Barnard, et al. for System and Method for Ongoing Supporting a Procurement and Accounts Payable System.

U.S. patent application Ser. Nos. 09/444,257, entitled "System and Method for Assessing a Procurement and Accounts Payable System", 09/444,254, entitled "System and Method for Project Preparing a Procurement and Accounts Payable Process", 09/444,255, entitled "System and Method for Project Designing and Developing a Procurement and Accounts Payable Process", and 09/444,253, entitled "System and Method for Deploying a Procurement and Accounts Payable Process" filed concurrently herewith, are assigned to the same assignee hereof and contain subject matter related, in certain respect, to the subject matter of the present application. The above-identified patent applications are incorporated herein by reference.

BACKGROUND OF THE INVENTION

1. Technical Field of the Invention

This invention pertains to the implementation of a procurement and accounts payable system or application. More particularly, it relates to a system and method for assessing, preparing, designing and developing, deploying, and supporting a general procurement and accounts payable system using electronic requisitions.

2. Background Art

A services company may be very good at implementing information technology (IT) solutions. However, as customer engagements increase, the ability of company to execute numerous engagements on time and within budget with quality becomes more difficult.

Today there exist many different software packages that perform project management and classes that teach methodologies for implementing solutions that involve information technology and services. However, there is no process that combines these activities along with an evaluation of a client's general procurement (GP) and accounts payable (AP) system, or application, into one package while providing detailed implementation instructions along with templates for completing the major deliverables required over the course of the project. Templates, may be used herein as an equivalent term for page, form, or document as used in connection with Lotus Notes. In Lotus Notes, a page is a database design element that displays information; a form, like a page, displays information and also can be used to collect information; and documents are the elements that store information in the database. A user is presented a form including fields for entering information. When the user fills out the information and saves it, the information is saved in the data base as a document. When a user opens the document, the document uses the form as a template to provide the structure for displaying the data or information. Fields store data of various types, including text, dialog list, rich text, and so forth.

Scalability of engagements is a known problem, the most common solution to which is to increase the number of persons involved. Experience has shown that this increase results in customer dissatisfaction due to inadequate gathering of requirements, poorly trained implementation teams, missed schedules, increased costs, and lower quality.

It is characteristic of general procurement and accounts payable systems that no two are identical, and may differ even within wholly owned subsidiaries of a single corporation.

Consequently, there is a need in the art for a system and method for evaluating a potential client system and for adapting a general procurement and accounts payable system to the requirements of each of many potential clients. Further, there is a need for a system and method for evaluating a potential client system and for adapting a general procurement and accounts payable system to the requirements of each of many potential clients which can be licensed to third party providers together with a system and method for monitoring and assuring the quality of services provided by those service providers.

There is a need in the art for an integrated system for assessing, preparing, designing and developing, deploying, and supporting a procurement and accounts payable system using electronic requisitions.

During project assessment, typically potential customers are contacted and evaluated by a marketing team that then recommends a product solution from their menu. There is no integration of Technical Team Leaders and Transition Management as key components of the installation. There is also limited to no flexibility to customize the product for the customer.

There is a large body of work on project planning in industry. While they are all more or less adequate, they do not provide the comprehensive integration of the client and supplier teams, Transition Management, and Quality required to accomplish a particular customer's goals.

Like project planning, project design and development processes are well known in industry. They usually consist of a project manager or team leader that manages the implementation of a project plan and interfaces with the client.

Deployment or implementation of a project is, again, a very standard operation. As the project plan steps are completed, they are usually held in queue until all necessary activities reach a point where the solution can be "turned on".

All projects have close out functions that wrap up the end of the project. However, they do not provide for continuing support across the multitude of functions that have been used to provide the customer with a solution.

It is an objective of the invention to provide a system and method for evaluating a client's general procurement and accounts payable (GP/AP) system.

It is an object of the invention to provide an optimized solution for out-sourcing procurement of goods and services.

It is an object of the invention to provide a system and method for training service providers.

It is an object of the invention to provide a system and method for managing service providers to assure quality of service.

It is an object of the invention to provide a system and method for managing a project.

It is an object of the invention to provide an optimized general procurement and accounts payable system characterized by lower costs, a paperless process, and more comprehensive service with a shorter cycle time.

SUMMARY OF THE INVENTION

A system for providing ongoing support for a general procurement and accounts payable application includes a server; a storage device connected to the server; a plurality of team terminals; and a communication link interconnecting the server and terminals. The server is operable for (1) maintaining a database of templates on the storage device describing procedures for supporting the application and (2) serving the templates to team members operating the terminals for coordinating, recording, and tracking team activities executing the procedures with respect to supporting the application. These procedures include user education, survey and quality auditing tasks.

A method for providing ongoing support for a general procurement and accounts payable application of a customer of an enterprise includes maintaining a database of templates describing procedures for supporting an operational general procurement and accounts payable system; and operating a plurality of web-enabled user terminals to access via a server the database for coordinating tasks by a plurality of enterprise teams implementing the procedures. The procedures include user education, survey and quality auditing tasks.

In accordance with an aspect of the invention, there is provided a computer program product configured to be operable for providing ongoing support for a general procurement and accounts payable application of a customer of an enterprise.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 5 and 6 also illustrate fields collected in the database and selectively displayed at user terminals of FIG. 1 for each summary and detail task, respectively, of a GP/AP system for a particular customer or project.

BEST MODE FOR CARRYING OUT THE INVENTION

Figure 1:
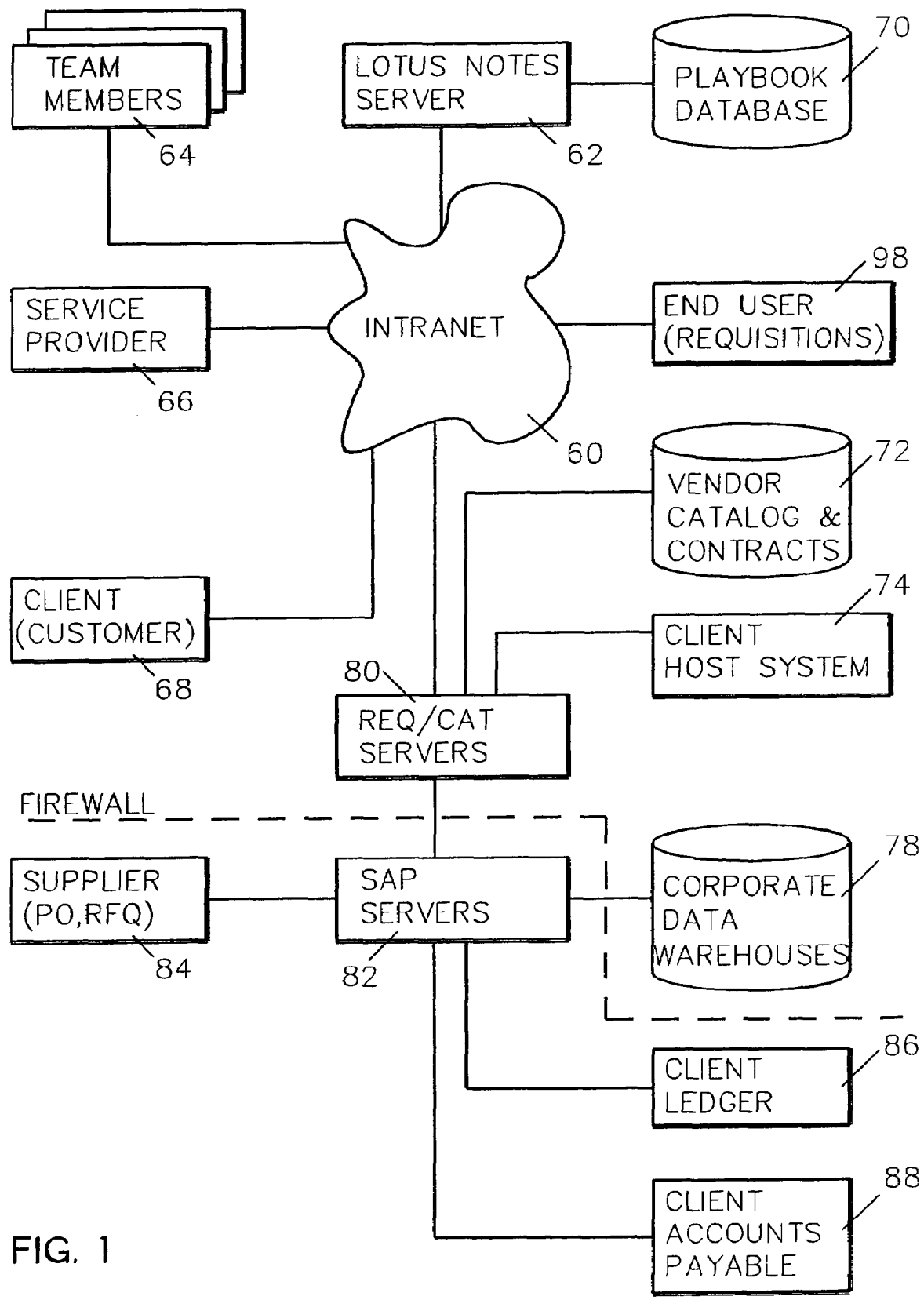
FIG. 1 is a high level block diagram of a general procurement and accounts payable development and implementation system in accordance with a preferred embodiment of the invention.

Referring to FIG. 1, in accordance with the preferred embodiment of the invention, intranet communication facilities interconnect a plurality of team member terminals 64, zero or more service provider terminals 66, and client (also referred to as customer) terminals 68, and a server 62, preferably a Lotus Notes server.

Server 62 references and maintains playbook database 70. Database (also referred to as the playbook, or playbook database) 70 is provided for implementing procurement and accounts payable systems. This playbook 70 defines implementation steps and templates for creating the many required deliverables and project management functions. These functions include start and end dates, effort, duration, and so forth. This playbook also provides the steps and templates for training service providers 66 and serves as the repository for completed templates and as a source for auditing the performance of the service providers. As used herein, unless otherwise apparent from the context, system and applications are used to refer to hardware, software, procedures, instructional materials, and so forth, for implementing a general procurement and accounts payable process.

Also attached to intranet 60 are requisition and catalog (Req/Cat) servers 80. Server 80 functions as a front end server to accounting system server 82, and is connected to a file of vendor catalogs and contracts 72, to a client (customer) host system 74, and through a firewall to SAP servers 82. SAP server 82 is an accounting driver for the procurement and accounts payable (A/P) system of the customer. SAP servers 82 are connected to supplier systems 84, to a customer data warehouse 78, and to customer ledger and accounts payable systems 86, 88.

During the operational phase of a completed and functioning system, a customer (aka end user, or client) 98 enters requisitions via the intranet to server 80. Server 80 accesses client host system 74 for pricing, reports, etc., and vendor catalogs and contracts 72 to gather information needed by SAP servers 82 to generate purchase orders or requests for quotes (RFQs) to supplier 84, to update data warehouse 78, client ledger 86, and client accounts payable 88 systems. Warehouse 78 stores client data maintained by the supplier of the Req/Cat and general procurement system, which supplier may be the primary enterprise (a primary services organization, such as the IBM Corporation) with control of the design and implementation of the system, or a contractor of the enterprise qualified as a third party service provider.

In operation, during presales, assessment, preparation, development, deployment and support stages, team members 64, access database 70 via intranet 60 and server 62 to create a playbook including a detailed description of an accounts payable and Req/Cat system for a particular customer (aka client). This description is then used to personalize Req/Cat servers 80 and SAP servers 82 for the customer installation. During operation, a user 98 accesses Req/Cat server 80 via intranet 60 to enter a requisition or to query the status of previously entered requisition. When entering a requisition, Req/Cat responds to end user 98 with a form to complete. Req/Cat 80 accesses SAP server 82 through the firewall with the requisition or request for status. SAP server 82, responsive to a requisition, issues a purchase order or request for quote to supplier 84, and updates accounts payable 88 and ledger 86, as required through the normal procurement and accounting process implemented on behalf of the customer.

Figure 2:
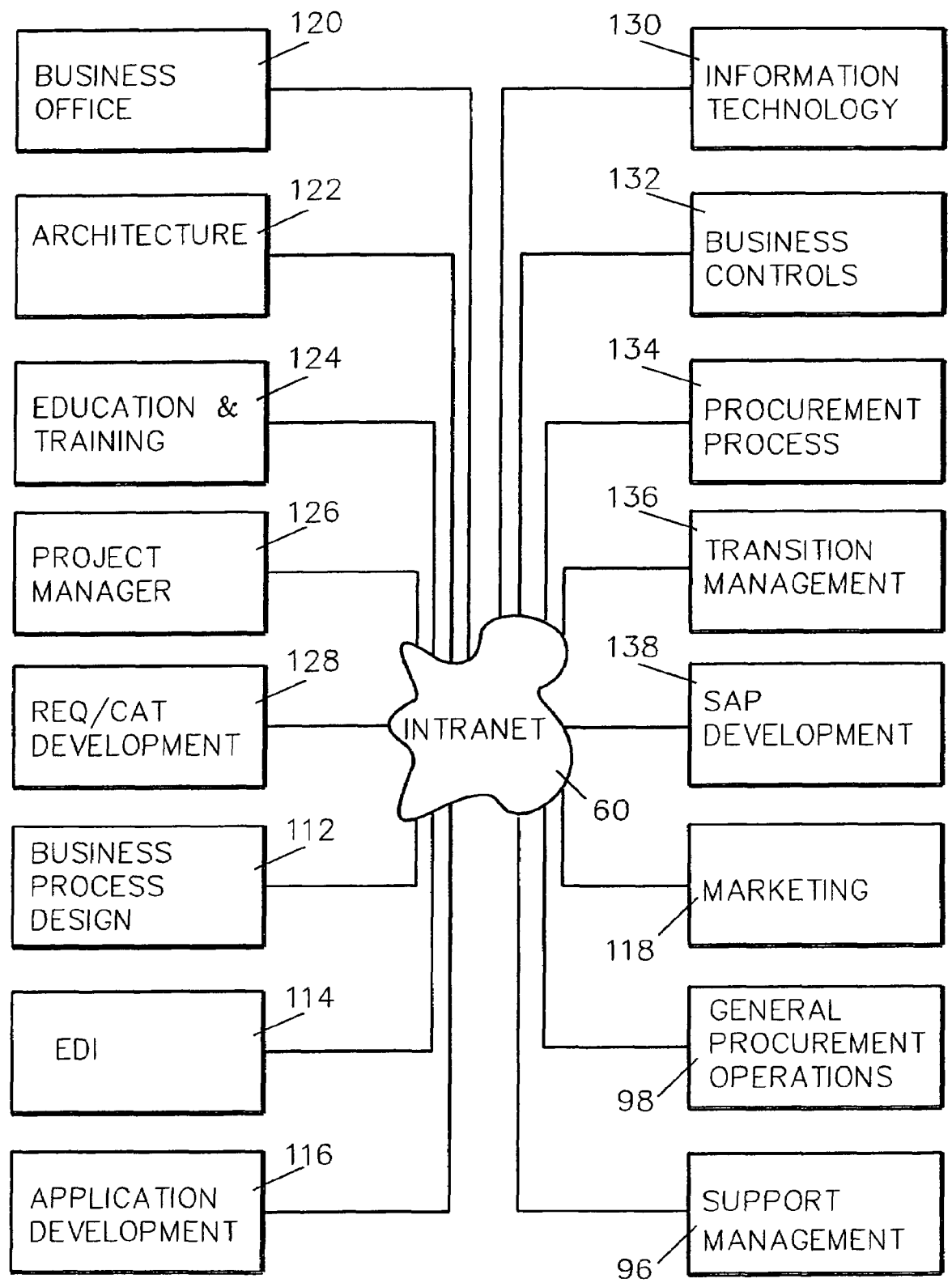
FIG. 2 is a block diagram illustrating team relationships within the general procurement and accounts payable (GP/AP) development and implementation system of a preferred embodiment of the invention.

Referring to FIG. 2, the various departments and individuals representing team members 64 include business office 120, architecture 122, education and training 124, project manager 126, Req/Cat development 128, business process design 112, electronic data interchange (EDI) 114, application development 116, information technology 130, business controls 132, procurement process 134, transition management 136, SAP development 138, marketing 118, general procurement operations 98, and support management 96. Each of these departments and individuals perform various rolls and functions during the life of the project from assessment through deployment and use, as will be more fully described hereafter in connection with FIG. 3.

Figure 3:
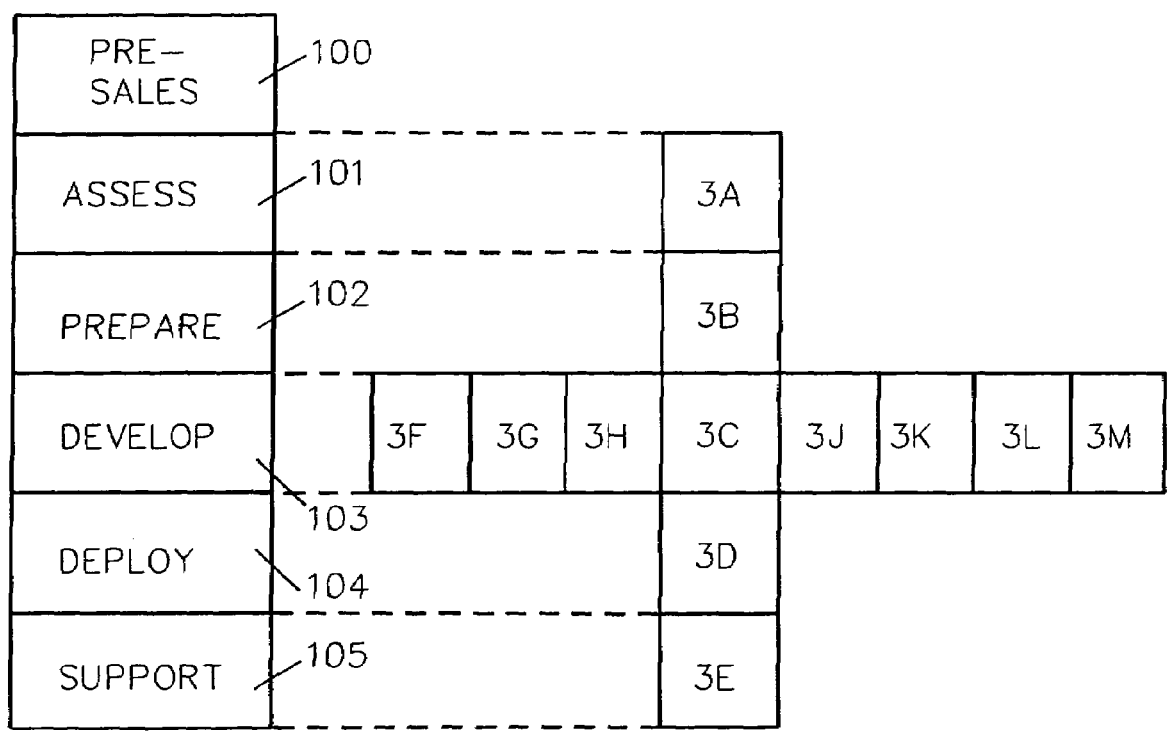
FIGS. 3A through 3H and 3J through 3M, arranged as shown in FIG. 3, are a flow diagram of the assessment, preparation, development, deployment and support phases of the method of a preferred embodiment of the invention.
Figure 3A:
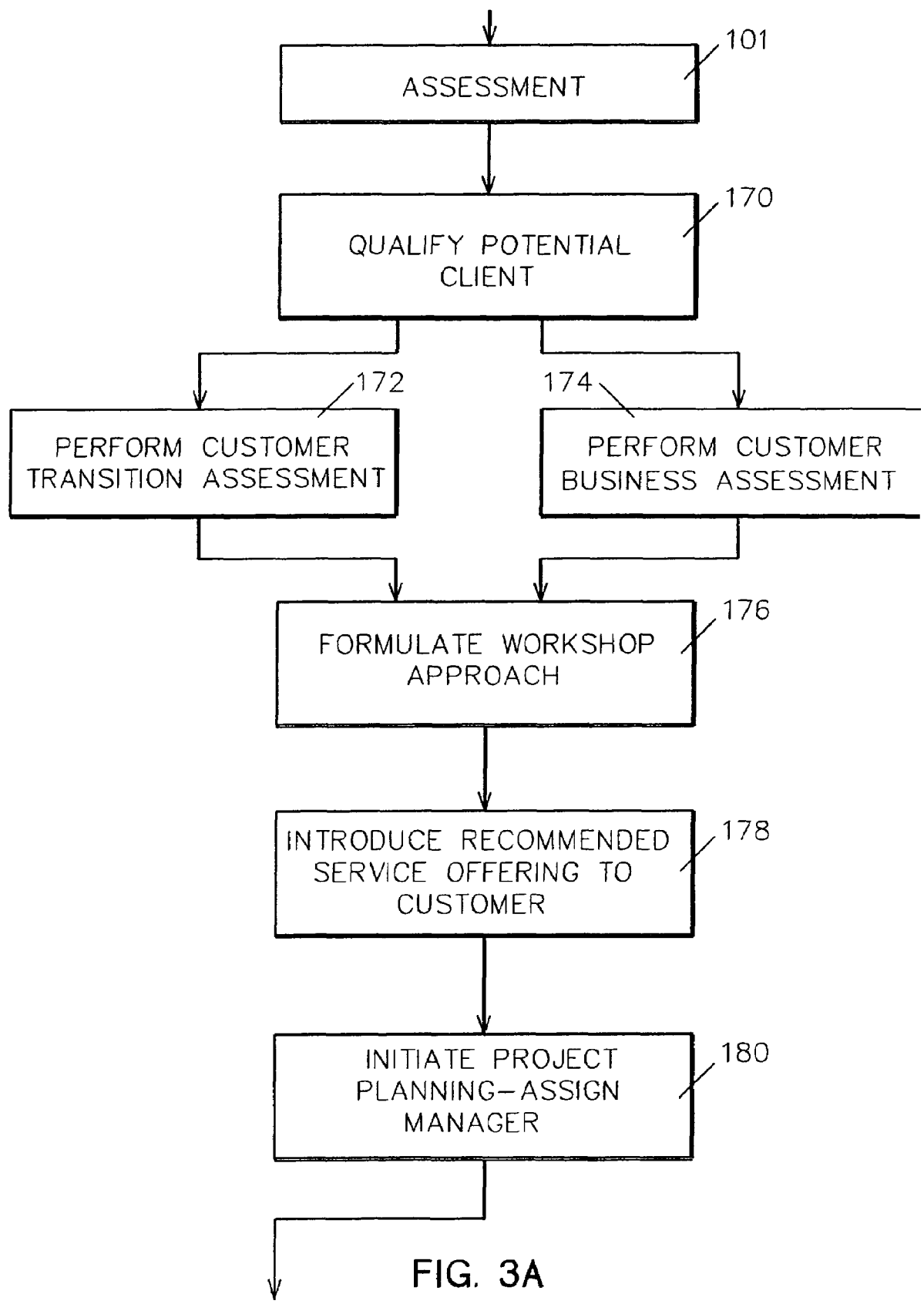
Figure 3B:
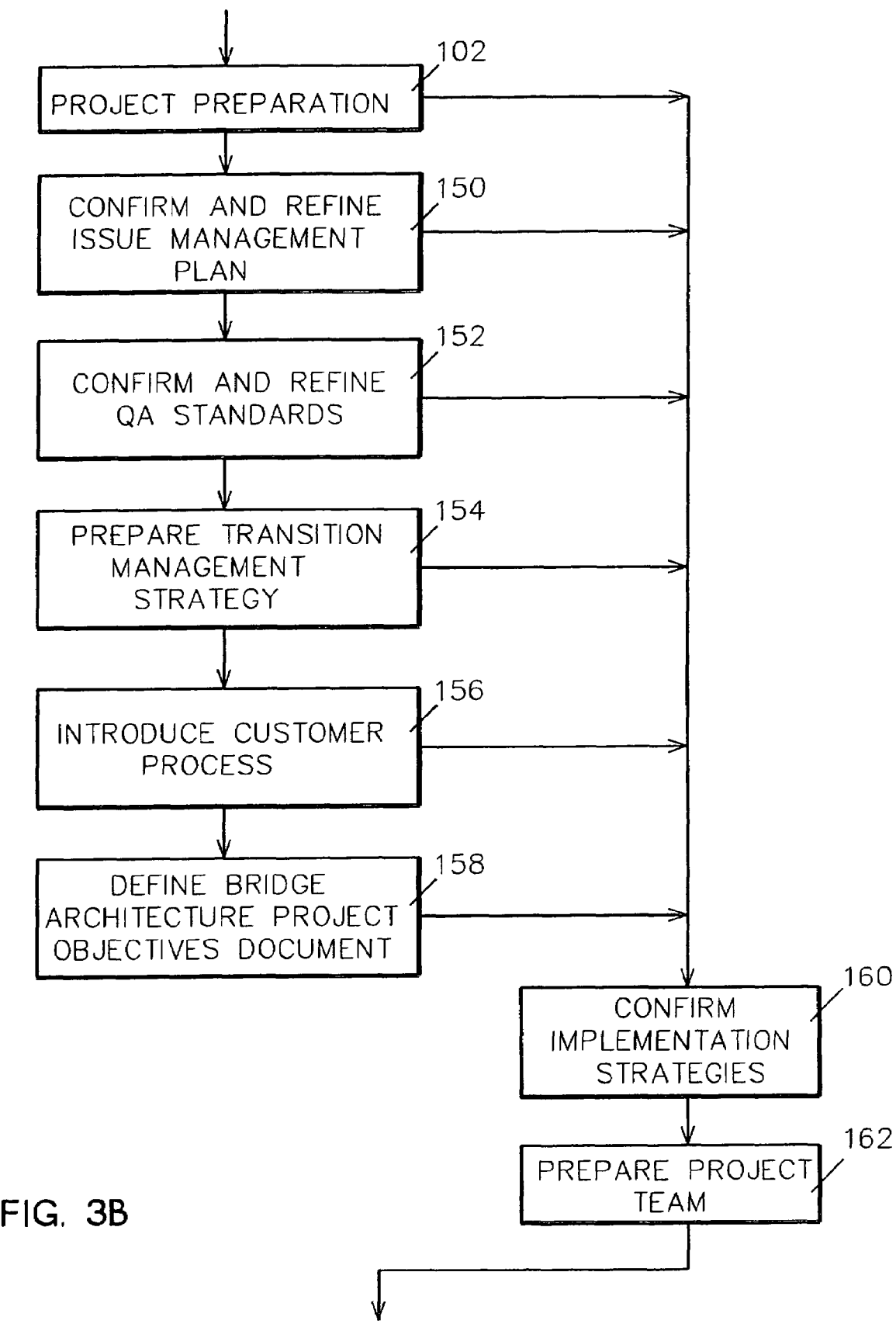
Figure 3C:
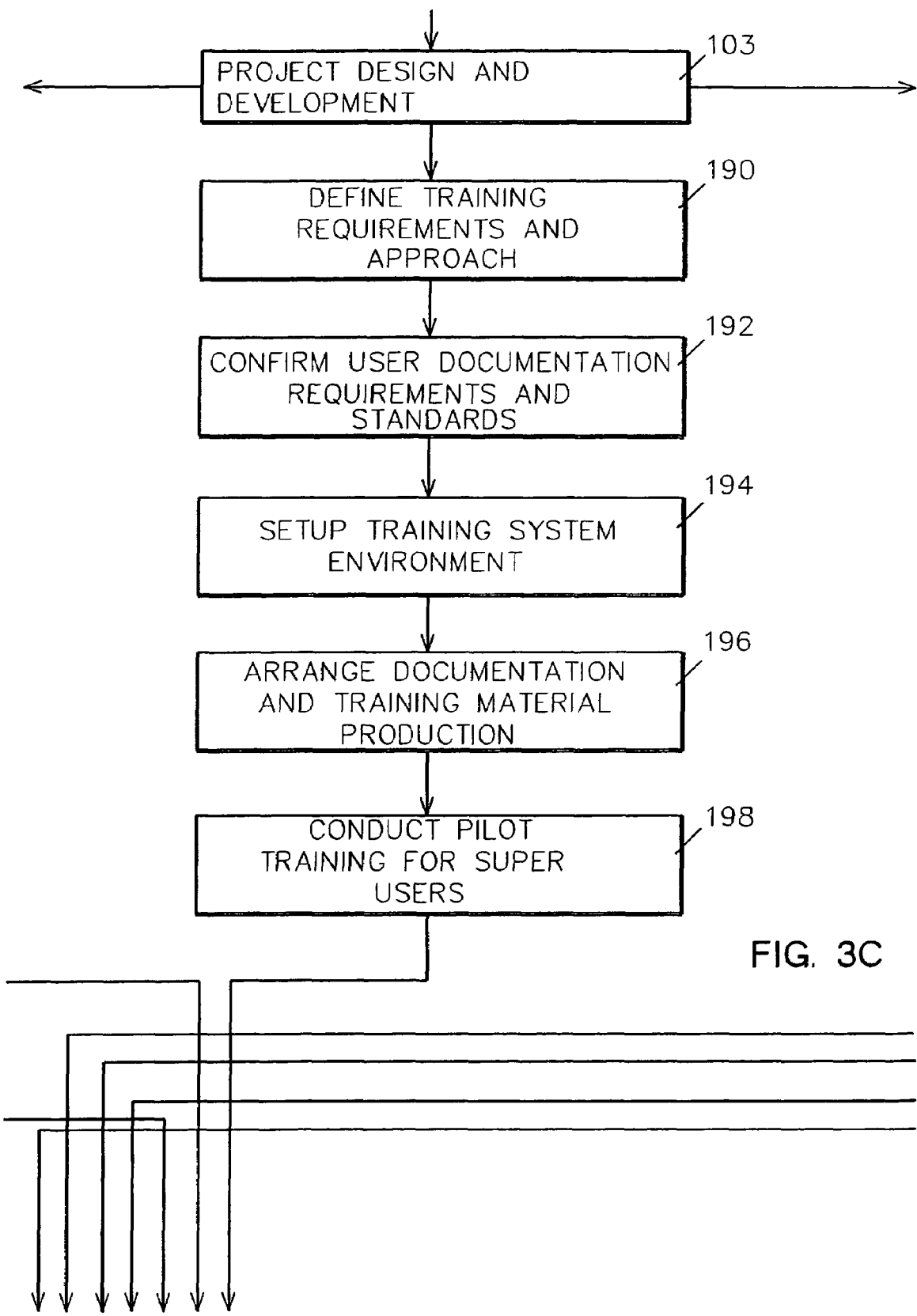
Figure 3D:
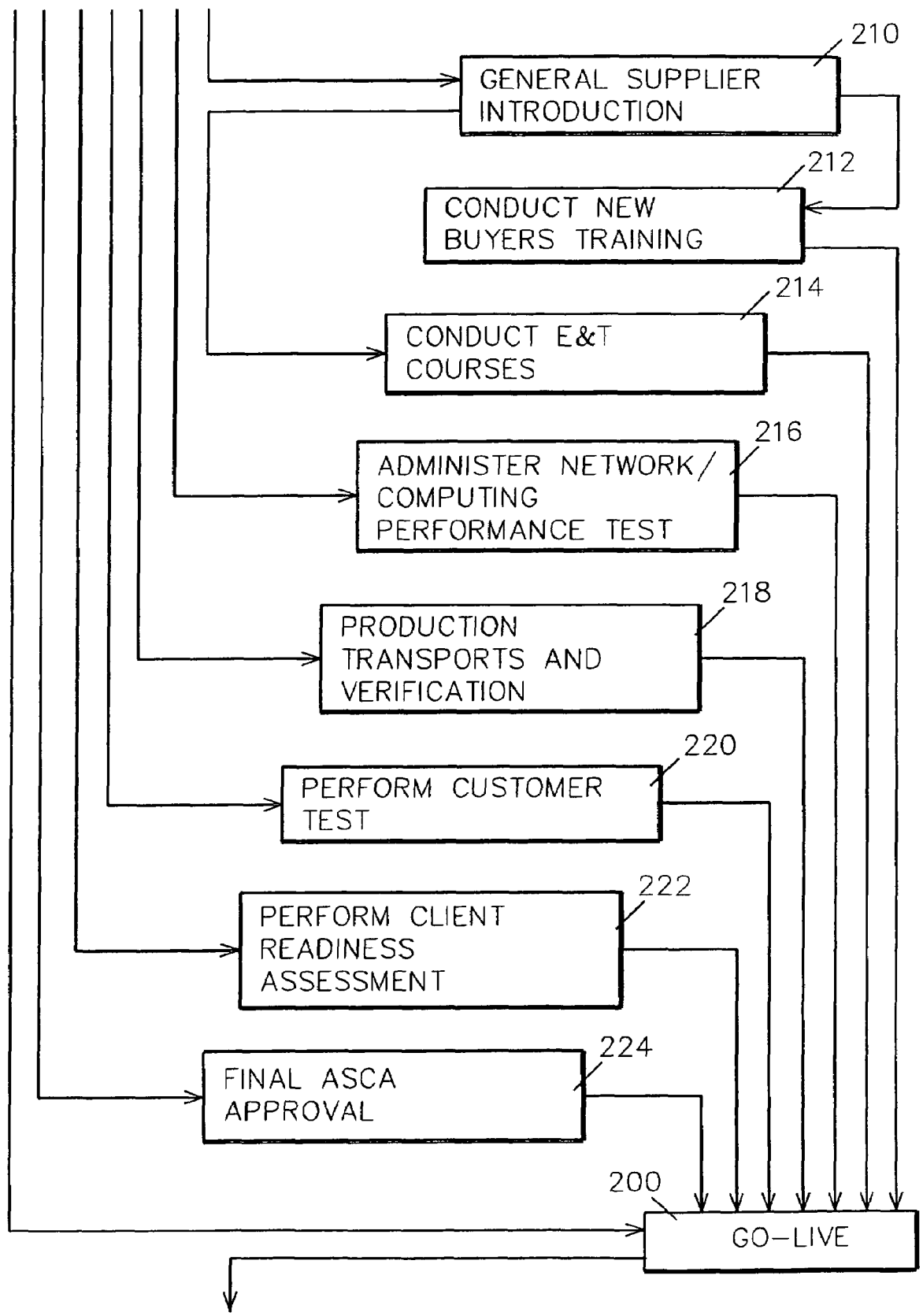

Referring to FIG. 3, in accordance with the preferred embodiment of the method of the invention, assessment 101, preparation 102, development 103, deployment 104 and support 105 stages are executed to design, implement, and use a general procurement and accounts payable (GP/AP) system for a customer. Through these stages 101-105, procedures and methods are provided for seamlessly integrating all aspects of a total GP/AP system, including creating an electronic purchase requisition for goods and services with flexible approval functions, through invoicing and payment.

Further in accordance with the preferred embodiment of the invention, there is provided a web enabled delivery system.

Further in accordance with the preferred embodiment of the invention, there is provided a system and method for auditing service provider activities without being on site.

High level summary tasks implemented by playbook 70 database include business controls, information technology, SAP, communication, process, testing, configuration, project management, transition management, education and training, requisition and catalog (Req/Cat). Each of these summary tasks, as well as the drill-down (aka subsidiary) tasks implementing the details of each, may be accessed by team members 64 and service provider 66s within the playbook database 70.

Figure 4:
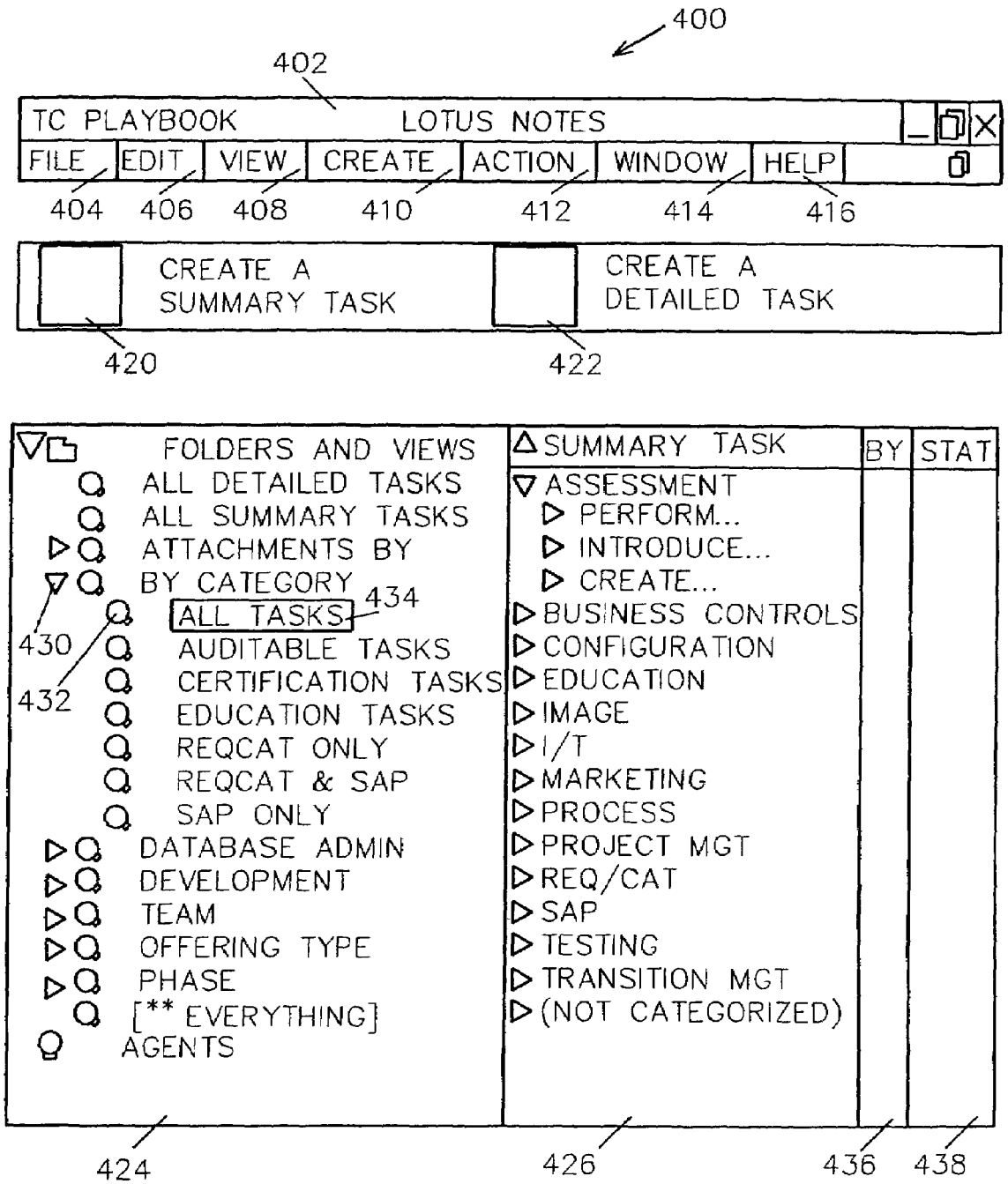
FIG. 4 represents a terminal display of a playbook summary view.

Referring to FIG. 4, the playbook summary view 400 is illustrated. View 400 includes a title bar 402; pull down menu tabs file 404, edit 406, view 408, create 410, actions 412, window 414, help 416; create a summary task selection button 420, create a detailed task button 422, a folders and views section 424, and a task title display and selection area 426 which also includes a by column 436 and a status column 438 with an entry for each task displayed in area 426. With by category button 430 and all tasks button 432 selected, all tasks 434 is highlighted and display 426 presents a listing of tasks organized by category.

Figure 5:
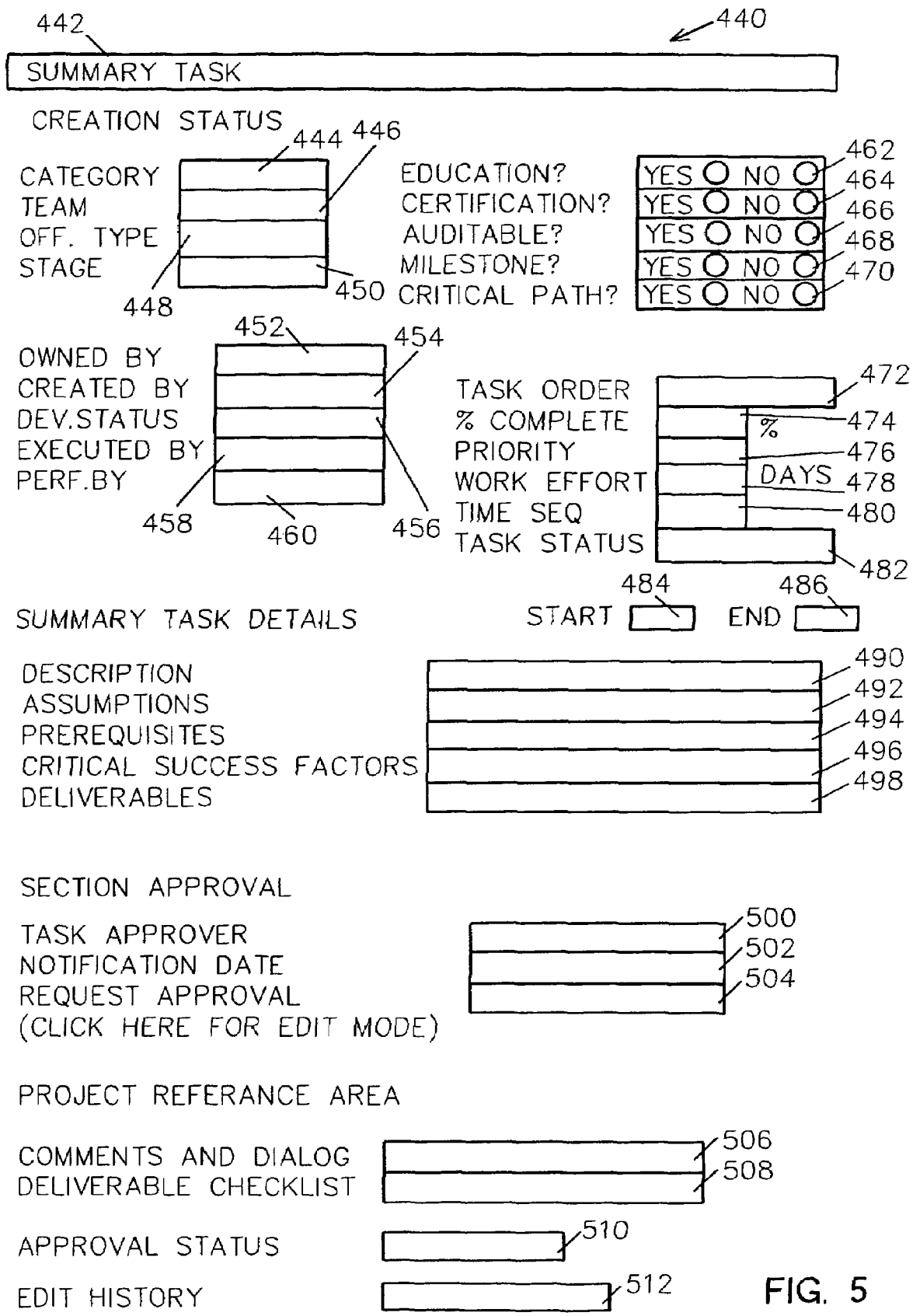
FIG. 5 illustrates a terminal display of the template presented by the server at a user terminal of FIG. 1 in response to selection by a user of "create a summary task" from the playbook summary view.
Figure 6:
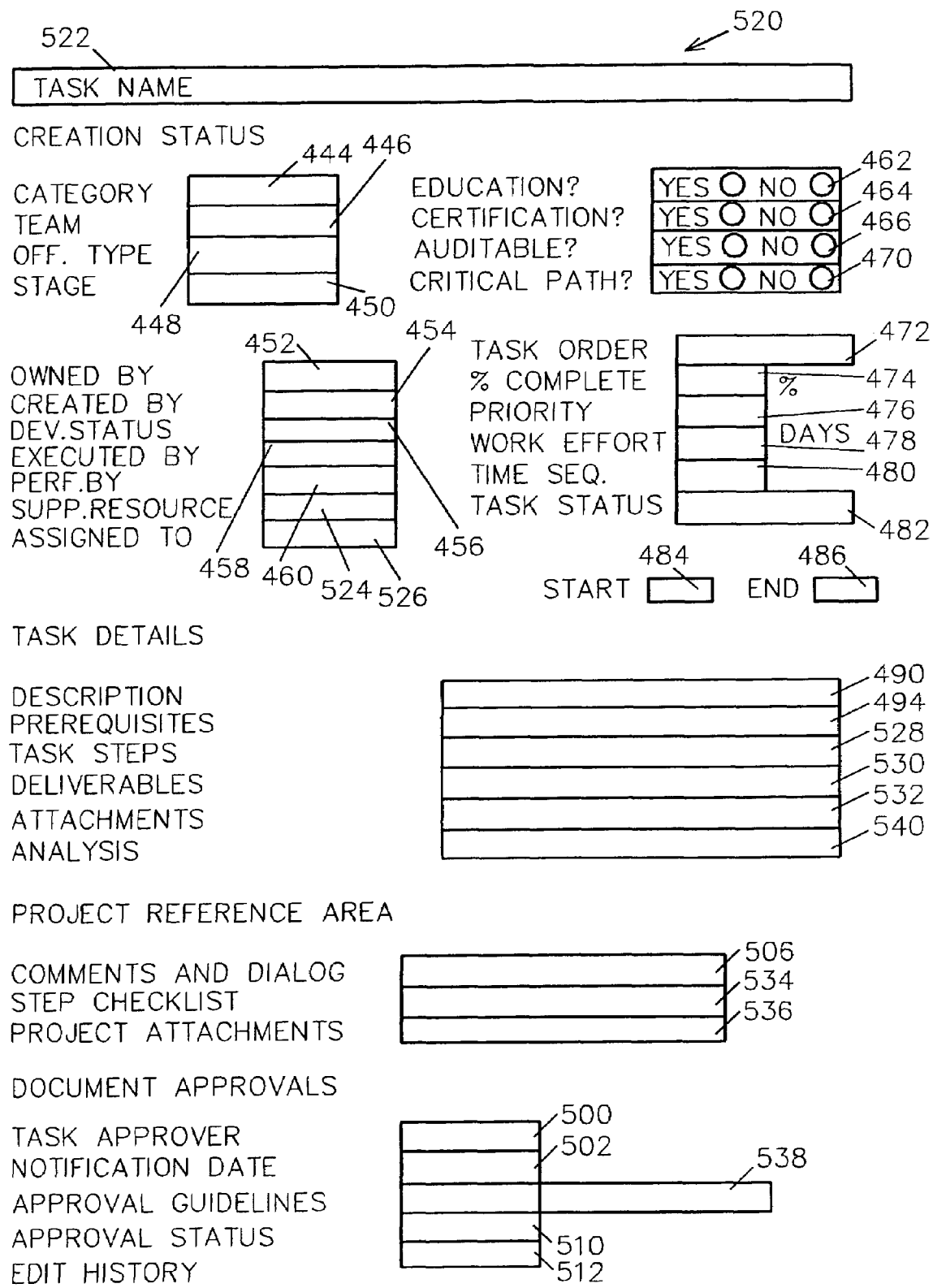
FIG. 6 illustrates a terminal display of the template presented by the server at a user terminal of FIG. 1 in response to selection by a user of "create a detailed task" from the playbook summary view.

Referring to FIG. 5, the summary task template 440 presented to the user upon selection of create a summary task 420 is illustrated. As will be described hereafter, there are two flavors of template 440, one for major operations, and one for major steps within each major operation. Referring to FIG. 6, the detail task template 520 presented to the user upon selection of create a detailed task 422 is illustrated.

Selection of create summary task 420 presents a first summary task template 440 that used to design and describe a high level summary task for one of the playbook operations. In a preferred embodiment of the invention, there are thirteen such high level summary tasks, including assessment, business controls, configuration, education, image, information technology (I/T), marketing, process, project management, requisition and catalog (req/cat), SAP, testing, and transition management. The summary and detail tasks within these high level summary tasks are further organized into five major processing segments: assessment 101, project preparation 102, project design and development 103, deployment 104, and ongoing support 105. A high level summary task provides a summary of the inputs to the task, and of the output (deliverables) after all detailed tasks are completed. There two levels, or templates for summary tasks: one for major operations, the second for major steps within each operation.

Activation of create a detail task 422 presents to the user a third template 520 which is used to summarize the detailed tasks for each major step of a summary task.

The first and second templates 440 are almost identical. They include the fields set forth in Tables 1 and 2. Third template 520 contents are summarized in Table 3.

TABLE 1

SUMMARY TASK TEMPLATES PART 1

| | |
|---|---|
| SECTION 1: | CREATION STATUS |
| Category 444: | Categories include education, req/cat development, SAP development, transformation management, architecture, procurement process. |
| Team 446: | Specific project team responsible for this task. |
| Offering type 448: | Kind of product being brought to client: req/cat only, SAP only, and req/cat and SAP. |
| Stage 450: | The stages are assessment 101, project preparation 102, project development 103, deployment 104, and support 105. |
| Doc owned by 452: | Team 140 owner of document, the designer of this one template. The teams 140 are those illustrated in FIG. 2. |
| Doc created by 454: | Author of this one template. |
| Dev status 456: | Approval status: first draft, final edit, final approval, etc. Only owner 452 can change this status. Only the owner 452 can approve the content of this template (task). |
| SECTION 2: | IMPORTANCE BUTTONS |
| Education 462: | Represents a combination of things, including (1) does someone need to be taught how to do this task, (2) is it something that should be included in the education package to the customer. |
| Certification 464: | Indicates whether or not an implementer of this task (ie, service provider) must be certified. |
| Auditable 466: | Indicates whether or not it is a task that Enterprise would be able to or needs to audit performance by the implementer/service provider |
| Milestone 468: | Indicates if this task is a critical accomplishment in the path of completing the implementation of the offering type. |
| Critical path 470: | Indicates if this is a task that must be completed in order to advance to the next task in order to complete the offering type, and can change during the course of the project as tasks are completed and the overall environment changes. |
| SECTION 3: | IMPLEMENTATION |
| Task order 472: | A number assigned to a detailed task that shows its order under the summary task. |
| % complete 474: | An estimate of how complete is this task document in its development for a particular customer. |

TABLE 1-continued

SUMMARY TASK TEMPLATES PART 1

| | |
|---|---|
| Executed by 458: | Name of service provider (eg., Enterprise, or some Enterprise partner). |
| Performed by 460: | Technical team responsible for doing this task. |
| Priority 476: | High, medium, low priority, based on whether this task is in critical path, and whether or not it needs to be done in support of some subsequent task. |
| Work effort 478: | Estimated time required to complete this task. |
| Sequence 480: | A number assigned to a summary task that shows its order under a higher level task. |
| Task status 482: | Represents how far the service provider has progressed in its implementation of this task. This is rolled up to Lotus Notes database 70 to enable the owner to track progress of the service providers during the audit phase. |

Table 2 sets forth the template 440 fields which may vary between templates, including those for major operations and major steps within an operation.

TABLE 2

SUMMARY TASK TEMPLATES PART 2

| | |
|---|---|
| SECTION 4: | SUMMARY TASK DETAILS |
| Description 490: | High level summary description of major operations or steps. |
| Assumptions 492: | What if any assumptions apply. |
| Prerequisites 494: | Tasks that must be completed before this task can complete. |
| Critical success factors 496: | Description of tools, techniques, relationships, understandings, technical and relationship skills and commitments, knowledge base of team and customer, and so forth, needed to accomplish this task. |
| Deliverables 498: | Expected output of this task. |
| SECTION 5: | APPROVALS |
| Task approver 500: | Identity of approvers. |
| Notification date 502: | Date approvers notified. |
| Request approval 504: | Electronic signature of approval. |
| SECTION 6: | PROJECT REFERENCE |
| Comments and dialog 506: | General comments (open season). |
| Deliverable checklist 408: | Checklist of deliverables. |
| Approval status 510: | List of approvers of this document and status of their approval. |
| Edit history 512: | Listing of persons who have modified this document during its preparation (service provider is not allowed to change these task descriptions.) |

TABLE 3

DETAIL TASK TEMPLATE

| | |
|---|---|
| SECTION 1: | CREATION STATUS |
| SECTION 2: | IMPORTANCE BUTTONS |

TABLE 3-continued

DETAIL TASK TEMPLATE

| | |
|---|---|
| SECTION 3: | IMPLEMENTATION |
| Sections 1, 2 and 3 are the same as for templates 440, with the addition of: | |
| Support resources 524: | People needed to support completion of this task. |
| Assigned to 526: | Person executing this task. |
| SECTION 4: | DETAIL TASK DETAILS |
| Description 490: | Description of this task. |
| Prerequisites 494: | Tasks that must be completed before this task can complete. |
| Task steps 528: | Specific detailed steps that need to be accomplished to complete the task. |
| Analysis 540: | A description of what needs to be analyzed to come up with the right answer for the customer. (The resulting output will vary depending upon the results of the analysis - but this document doesn't change as a result of the analysis). |
| Deliverables 530: | Expected output of the task. |
| Methodology attachments 532: | Potential attachments, may be blank: anything from presentation charts, to questionnaires, to architecture charts - depends upon the task. |
| SECTION 5: | PROJECT REFERENCE AREA |
| Comments & Dialog 506: | Comments. |
| Deliverable Checklist 508: | Checklist, attachment listing (other than method attachments, supra). |
| Approval status 510 | List of approvers and the status of their approval (with respect to approval of this document, not of the implementation of the task, which is handled by the audit process). |
| Edit history 512: | Listing of persons who have modified this document during its preparation (service provider is not allowed to change these task descriptions.) |

Database 70 at server 62 includes all summary and detail tasks templates which have been completed in a set for a particular customer. An initial set of the tasks listed in Table 4 is provided for each customer, but during project implementation phases 101-105, these are configured or personalized to the customer.

While many summary and detailed tasks of Table 4 do not appear in the flow chart of FIGS. 3A-3M, those selected illustrate a flow from start to finish across the five major stages—and form a representative, if not critical, path through them. As shown in FIGS. 3, and 3A-3M, the transitions between stages 100-105 are, in some instances, blurred and a particular task may be allocated to either or both of two of these stages.

In each stage, the key to success is the integration through the use of the templates of the groups (FIG. 2) and activities (Table 4, both summary tasks and detail tasks.) Also, an important aspect of the invention is the method provided across the five stages (FIG. 3) for effecting a transition from a legacy process, including hardware, software, work procedures and human resources, to a new process.

Table 4 is a chart of summary and detail tasks, pursuant to a particular embodiment of the invention, available for presentation in display area 426 of playbook summary view 400 upon selection of button 432. Selection by a user in display area 426 of a task designated with two or three alpha-numeric reference numerals P1, P11, P12, . . . , results in display of a template 440 personalized to the summary task, and selection of a task designated with four or more alpha-numeric reference numerals P111, P112, . . . , result in display of a template 520 personalized to the detail task. A user with appropriate authority may then view, correct, update, approve or otherwise modify the displayed task. The names of the detail tasks set forth broadly the functions or method steps performed in implementing the superior summary task. In Table 4, each summary task is identified in the first column by the stage 100-105 to which it pertains, in the second column by a task identifier P11, P12, . . . , and, for selected tasks, in the third column by the process step (150, . . . , 354 in FIGS. 3A-3M) to which it pertains. In general (with very few exceptions), a detail task pertains to the same stage 100-105 as its summary task.

TABLE 4

CHART OF SUMMARY AND DETAIL TASKS

| Stage | Task ID | Step | Summary Tasks / Detail Tasks |
|---|---|---|---|
| | | | FOLDERS AND VIEWS BY CATEGORY |
| | ALL TASKS | | |
| | P1 | | ASSESSMENT |
| 101 | P11 | | Perform customer service offering assessment |
| 101 | P111 | 174 | Perform customer business assessment |
| 101 | P112 | | Perform customer business assessment e-Req/Cat |
| 101 | P113 | | Develop workshop management plan |
| 101 | P114 | | Develop workshop management plan e-Req/Cat |
| 101 | P115 | | Review findings from marketing procurement consulting engagement |
| 101 | P116 | | Review findings from marketing procurement consulting engagement e-Req/Cat |
| 101 | P117 | 176 | Formulate workshop approach |
| 101 | P118 | | Formulate workshop approach e-Req/Cat |
| 101 | P119 | | Prepare for workshop |
| 101 | P11A | | Prepare for workshop e-req/Cat |
| 101 | P12 | 178 | Introduce recommend service offering to customer |
| 101 | P121 | | Present service offering to customer (perform workshop) |
| 101 | P122 | | Present service offering to customer (perform workshop) e-Req/Cat |
| 101 | P123 | | Formulate proposal approach |
| 101 | P124 | | Formulate proposal approach e-Req/Cat |
| 101 | P13 | | Create proposal and contract |
| 101 | P131 | | Develop and cost proposal |
| 101 | P132 | | Develop and cost proposal e-Req/Cat |
| 101 | P133 | | Draft and price customer contract |
| 101 | P134 | | Draft and price customer contract e-Req/Cat |
| | P2 | | BUSINESS CONTROLS |
| 103 | P21 | | Business control requirements |
| 103 | P211 | 290 | Confirm business controls requirements |
| 103 | P212 | | Confirm separation of duties (SOD) requirements |
| 104 | P213 | 292 | Conduct ASCA self-assessment |
| 104 | P214 | | Risk assessment |
| 104 | P215 | 224, 294 | Conduct ASCA/business controls review |
| 102 | P2151 | | Confirm image production system management strategy |
| | P3 | | CONFIGURATION |
| 103 | P31 | 320 | Conduct Req/Cat functional detailed fit gap analysis |
| 103 | P311 | | Confirm Req/Cat organizational hierarchy |
| 103 | P312 | | Define the Req/Cat functional detailed fit |
| 103 | P313 | | Resolve functional gaps for Req/Cat |
| 103 | P32 | 324 | Configure Req/Cat offering |
| 103 | P321 | | Confirm and refine "Ives Team Studio" for code tracking |
| 103 | P322 | | Confirm and refine Req/Cat initial settings and organizational structure |
| 103 | P323 | | Confirm and refine Req/Cat authorizations |
| 103 | P324 | | Refine and validate final Req/Cat configuration |
| 103 | P33 | | Customize Req/Cat offering |
| 103 | P331 | | Validate and customize Req/Cat core application change request |
| 103 | P332 | | Refine and validate final customization for Req/Cat |
| 103 | P34 | | Produce custom Req/Cat programs |
| 103 | P341 | 276 | Validate and code bridge change requests (SAP and Req/Cat) |
| | P4 | | EDUCATION AND TRAINING |
| 102 | P41 | | Develop customer education and training strategy |
| 102 | P411 | | Validate customer education & training objectives |
| 102 | P412 | 190 | Define the training requirements and approach |
| 102 | P413 | | Confirm the education & training strategy |
| 102 | P42 | | Define system management processes |
| 102 | P421 | | Define SAP correction and transport process |
| 102 | P422 | | Define and agree on service level agreement SLA |
| 102 | P423 | | Define and administer SAP release control process |
| 102 | P424 | | Define Req/Cat transport process |
| 102 | P425 | | Define and administer version control process |
| 103 | P43 | 192 | Define user documentation and training requirements |
| 103 | P431 | | Define customer user audiences and requirements |
| 103 | P432 | | Confirm user documentation requirements and standards |
| 103 | P433 | | Conduct detailed end-user task analysis |
| 103 | P434 | | Assess user skills and training needs |
| 103 | P435 | | Validate end-user courses and content |
| 103 | P436 | | Identify users and course attendees |
| 103 | P437 | | Define and notify training attendees |
| 103 | P44 | | Develop user training documentation |
| 103 | P441 | | Produce customer specific end-user documentation |
| 103 | P442 | | Confirm training evaluation materials/approach with customer |
| 103 | P443 | 194 | Setup training system environment |
| 103 | P444 | | Validate training logistics |
| 103 | P445 | 198 | Conduct pilot training with super users |

TABLE 4-continued

CHART OF SUMMARY AND DETAIL TASKS

| Stage | Task ID | Step | Summary Tasks / Detail Tasks |
|---|---|---|---|
| 103 | P446 | 196 | Arrange documentation and training material production |
| 103 | P45 | | Internal (Enterprise, service provider) training requirements |
| 103 | P451 | | Identify and organize appropriate internal training |
| 104 | P46 | | Conduct end-user training |
| 104 | P461 | | Conduct train-the-trainer sessions |
| 104 | P462 | 214, 230 | Perform training |
| 104 | P463 | 212 | Conduct new buyer training |
| | P5 | IMAGE | |
| 103 | P51 | | Conduct image functional detailed fit gap analysis |
| 103 | P511 | | Define the image functional detailed fit |
| 103 | P512 | | Resolve image functional gaps |
| 103 | P52 | | Configure image offering |
| 103 | P521 | | Refine and validate final image configuration |
| 103 | P522 | | Confirm and refine image initial settings |
| | P6 | I/T | |
| 103 | P61 | | Establish customer network/computing infrastructure |
| 103 | P611 | | Confirm component delivery |
| 103 | P612 | | Establish network/computing hardware/software architecture infrastructure |
| 103 | P613 | | Ready network/computing environment |
| 103 | P62 | | Establish EDI infrastructure |
| 103 | P621 | | Establish EDI infrastructure |
| 103 | P622 | | Conduct trading partner testing (IT) |
| 102 | P623 | | Confirm EDI strategy |
| 102 | P6231 | | Setup image system environments |
| 103 | P6232 | | Establish cutover checklist and perform pre-cutover activities for image production environment |
| 104 | P6233 | | Validate image production support for system management |
| 103 | P63 | | Develop reporting infrastructure |
| 103 | P631 | | Develop reporting infrastructure (LIS/EIS) |
| 103 | P632 | | Develop DataMart extracts |
| 103 | P633 | 232 | Develop additional reports (customer/operations) |
| 102 | P64 | | Perform bridge architecture assessment |
| 102 | P641 | | Perform bridge architecture integration point interfaces work session |
| 102 | P642 | 158 | Define bridge architecture project objectives document |
| 102 | P65 | | Validate bridge, EDI, vendor reporting requirements |
| 102 | P651 | 270 | Develop and manage bridge architecture implementation work plan |
| 102 | P652 | | Analyze EDI requirements |
| 102 | P653 | | Determine EDI communication environment |
| 102 | P654 | | Analyze vendor master data load |
| 102 | P655 | | Analyze operational reporting requirements |
| 102 | P656 | | Analyze customer requirements for DataMart implementation |
| 102 | P657 | | Schedule and conduct weekly interlock meeting |
| 102 | P658 | | Vendor lead client analysis |
| 102 | P66 | | Set up development/integration environment |
| 102 | P661 | | Set up SAP development/integration environment |
| 102 | P662 | | Set up Req/Cat system environments |
| 103 | P67 | | Set up consolidation/test environment |
| 103 | P671 | | Set up SAP consolidation/test environment |
| 104 | P68 | 218 | Set up production environment |
| 104 | P681 | | Convert vendor master into production environment |
| 104 | P682 | | Determine EDI tasks for production environment set up |
| 104 | P683 | | Execute SAP cutover checklist |
| 104 | P684 | | Set up SAP production environment |
| 104 | P685 | | Establish SAP batch schedule |
| 104 | P686 | | Set up trading partners in production environment |
| 104 | P687 | | Vendor lead client deployment |
| 103 | P688 | | Establish cutover checklist and perform pre-cutover activities for SAP production environment |
| 103 | P689 | | Establish cutover checklist and perform pre-cutover activities for e-Req/Cat production environment |
| 105 | P69 | | Refine/execute production support for system management |
| 105 | P691 | 234 | Perform on-going support activities for Req/Cat |
| 105 | P692 | | Post deployment reporting support |
| 105 | P693 | | Develop new bridges and application extensions post go live |
| 105 | P694 | 236 | Support new EDI transactions post go live |
| 105 | P695 | | Execute system management security support procedures |
| 105 | P696 | | Execute data management support procedures |
| 105 | P697 | 236 | Execute EDI support procedures |
| 105 | P698 | | Execute system management operational support desk procedures |
| 105 | P699 | | Execute system management batch support desk procedures |
| 105 | P69A | | Execute system management SAPBI support procedures |
| 105 | P69B | | Execute system management master data support procedures |
| 105 | P69C | | Execute production support for system management |
| 103 | P6A | | Establish vendor master environment |
| 103 | P6A1 | | Establish vendor master |
| 103 | P6A2 | | Confirm vendor master |
| 103 | P6A3 | | ALE configuration for VLC |
| 103 | P6B | | Establish bridge architecture infrastructure environment |
| 103 | P6B1 | 272 | Develop detail architecture requirements definition |
| 102 | P6C | 274 | Validate system infrastructure requirements |
| 102 | P6C1 | 280 | Analyze current network/computing infrastructure |
| 102 | P6C2 | | Determine network/computing requirements for project |
| 102 | P6C3 | | Confirm and begin network/computing component acquisition |
| 102 | P6C4 | | Order and delivery of infrastructure components |
| | P7 | MARKETING | |
| 100 | P71 | | Participate in marketing procurement consulting engagement |
| 100 | P711 | 170 | Qualify potential client |
| 100 | P712 | | Qualify potential client e-Req/Cat |
| 100 | P713 | | Develop assessment statement of work (SOW) e-Req/Cat |
| 100 | P714 | | Develop assessment statement of work (SOW) |
| | P8 | PROCESS | |
| 102 | P81 | 156 | Customer process introduction |

TABLE 4-continued

CHART OF SUMMARY AND DETAIL TASKS

| Stage | Task ID | Step | Summary Tasks / Detail Tasks |
|---|---|---|---|
| 102 | P811 | | Conduct customer introduction to Golden procurement and A/P processes |
| 102 | P82 | | Process reviews with customer - procurement and A/P |
| 102 | P821 | 344 | Review procurement processes with customer |
| 102 | P822 | 342 | Review A/P processes with customer |
| 102 | P83 | | Assess customer impact on internal Enterprise workload |
| 102 | P831 | | Identify current and potential supplier catalogs for customer |
| 102 | P832 | 340 | Perform assessment of customer purchasing business |
| 103 | P84 | | Process alignment customer/Golden |
| 103 | P841 | | Determine GAPs between customer and golden processes |
| 103 | P842 | | Perform process GAP resolution |
| 103 | P85 | | BMP process and procedures management |
| 103 | P851 | | Codes and procedures |
| 103 | P852 | 348 | Update and review process management & procedures manual |
| 103 | P86 | | Supplier readiness |
| 103 | P861 | 210 | General supplier introduction |
| 103 | P862 | | Manage trading partner - EDI suppliers |
| 103 | P863 | 346 | Establish ASAP suppliers for customer (ASAP = a SAP supplier not requiring a buyer) |
| 103 | P864 | | Manage customer supplier outline agreements |
| 103 | P865 | | Customer freight procedures |
| 104 | P866 | | Supplier memo mailing |
| | P9 | | PROJECT MANAGEMENT |
| 102 | P91 | 180 | Initiate project planning |
| 102 | P911 | 160 | Confirm project scope and implementation strategy |
| 102 | P912 | | Confirm project organization and assign resources to roles |
| 102 | P913 | | Prepare and validate project plan and procedures |
| 102 | P914 | | Establish project team working environment |
| 102 | P915 | | Orient project team |
| 102 | P92 | 150 | Confirm and refine project management standards and procedures |
| 102 | P921 | | Confirm and refine issue management plan |
| 102 | P922 | | Confirm and refine project documentation |
| 102 | P923 | 152 | Confirm and refine quality assurance standards |
| 102 | P924 | | Create team building plan |
| 102 | P93 | | Confirm implementation strategies |
| 102 | P931 | | Confirm system configuration standards |
| 103 | P9311 | | Customize image offering |
| 103 | P9312 | | Validate and customize image core application change request |
| 103 | P93121 | | Refine and validate final customization for image |
| 102 | P932 | | Confirm CR/PTR process |
| 102 | P933 | | Confirm testing strategy |
| 102 | P934 | | Confirm production support & operations strategy |
| 102 | P935 | | Confirm SAP production system management strategy |
| 102 | P936 | | Confirm e-Req/Cat production system management stategy |
| 102 | P937 | 282 | Confirm network/computing strategy |
| 102 | P938 | | Confirm vendor conversion strategy |
| 102 | P94 | 162 | Prepare project team |
| 102 | P941 | | Conduct kick-off meeting |
| 102 | P942 | | Conduct project team standards meeting |
| 102 | P943 | | Conduct project team training |
| 102 | P95 | 352 | Define production support plans |
| 102 | P951 | | Define system management SAP resource requirements |
| 102 | P952 | | Define system management e-Req/Cat resource requirements |
| 102 | P953 | | Define production support accounts payable plan |
| 102 | P954 | | Define production support CSC plan |
| 102 | P955 | | Define production support general procurement plan |
| 102 | P956 | | Confirm SAP system authorizations for project team |
| 102 | P957 | | Confirm Req/Cat access control list (ACL) |
| 102 | P958 | | Define system management image resource requirements |
| 102 | P96 | | Initial quality assurance review |
| 102 | P961 | | Initial QA review |
| 103 &104 | P97 | | Review project status and refine project plan |
| 103, &104 | P971 | | Conduct project team status meetings |
| 103 &104 | P972 | | Conduct steering committee meetings |
| 101 | P98 | | Obtain customer approval |
| 102 | P981 | | Won bid analysis/transition to implementation team |
| 102 | P982 | | Won bid analysis/transition to implementation team e-Req/Cat |
| 101 | P983 | | Conduct lost bid analysis |
| 101 | P984 | | Conduct lost bid analysis e-Req/Cat |
| 104 | P99 | | Validate production support |
| 104 | P991 | | Validate SAP production support for system management |
| 104 | P992 | | Validate production support for accounts payable |
| 104 | P993 | | Validate production support for CSC |
| 104 | P994 | | Validate production support for general procurement |
| 104 | P995 | | Validate Req/Cat production support for system managment |
| 105 | P996 | | Validate education & training production support activities |
| 104 | P9A | | Perform go live project office activities |
| 104 | P9A1 | | Ensure go live check lists activities |
| 104 | P9A2 | | Go/no-go decision for go live |
| 103 &104 | P9B | | Interim quality assurance reviews |
| 103 &104 | P9B1 | | Interim QA reviews |
| 105 | P9C | 244 | Post-implementation quality assurance review |
| 105 | P9C1 | | Post-implementation QA review |
| 105 | P9D | | Production support review |
| 105 | P9D1 | | Confirm production environment |
| | PA | REQ/CAT | |
| 102 | PA1 | | Identify customer responsibilities for Req/Cat |
| 102 | PA11 | | Identify country/global administrators & neg. con person |
| 102 | PA12 | | Perform country administrator education |
| 103 | PA2 | | Prepare and load Req/Cat catalog data |
| 103 | PA21 | | Perform Req/Cat catalogue tasks |
| 104 | PA3 | | Req/Cat production readiness |
| 104 | PA31 | | Confirm Req/Cat for production environment |

TABLE 4-continued

CHART OF SUMMARY AND DETAIL TASKS

| Stage | Task ID | Step | Summary Tasks / Detail Tasks |
|---|---|---|---|
| 104 | PA32 | | Set up Req/Cat tables in production |
| 104 | PA33 | | Prepare Req/Cat production copy |
| 104 | PA34 | | Execute Req/Cat go live checklist |
| | PB | SAP | |
| 103 | PB1 | 254 | Conduct SAP functional detailed fit gap analysis |
| 103 | PB11 | 250 | Confirm SAP organizational hierarchy |
| 103 | PB12 | | Define the SAP functional detailed fit |
| 103 | PB13 | | Resolve SAP functional gaps |
| 103 | PB2 | | Produce custom SAP programs |
| 103 | PB21 | | Develop and validate SAP custom programs |
| 103 | PB3 | 252 | Configure SAP offering |
| 103 | PB31 | | Confirm and refine implementation guide |
| 103 | PB32 | | Confirm and refine SAP initial settings and organizational structure |
| 103 | PB33 | | Confirm and refine SAP end user authorization profiles |
| 103 | PB34 | | Refine and validate final SAP configuration |
| 103 | PB4 | | Customize SAP offering |
| 103 | PB41 | | Validate and customize SAP core application change request |
| 103 | PB42 | | Refine and validate final customization for SAP |
| | PC | TESTING | |
| 103 | PC1 | 256, 260, 322 | Perform preparation activities for testing (both Req/Cat and SAP) |
| 103 | PC11 | | Confirm and refine test case templates |
| 103 | PC12 | 258, 326 | Build comprehensive test plan |
| 103 | PC13 | | Develop test environment plan |
| 103 | PC14 | | Create test case specifications |
| 103 | PC15 | | Build/reuse test cases |
| 103 | PC16 | | Determine testing tools |
| 103 | PC17 | | Review and validate comprehensive test plan |
| 103 | PC2 | 216 | Perform comprehensive testing |
| 103 | PC21 | | Perform unit test |
| 103 | PC22 | 262 | Perform component test |
| 103 | PC23 | 264, 328 | Perform integration test |
| 103 | PC24 | | Administer network/computing performance monitoring |
| 103 | PC25 | 266, 330 | Perform system test |
| 103 | PC26 | 220 | Perform user acceptance test |
| 103 | PC27 | | Perform other required testing |
| 103 | PC271 | | Support comprehensive image testing |
| 103 | PC28 | | Support comprehensive e-Req/Cat testing |
| 103 | PC29 | | Support comprehensive SAP testing |
| 103 | PC2A | | Support comprehensive image testing |
| | PD | TRANSITION MANAGEMENT | |
| 101 | PD1 | 172 | Introduce transition management (assessment) |
| 101 | PD11 | 172 | Develop initial assessment of client |
| 101 | PD12 | | Provide transition management workshop presentation |
| 102 | PD2 | 154 | Model transition management (project preparation) |
| 102 | PD21 | | Provide transition management strategy |
| 102 | PD22 | | Evaluate cultural impact of solution |
| 102 | PD23 | 300 | Develop/confirm transition management plan |
| 102 | PD3 | | Develop communication plan (project preparation) |
| 102 | PD31 | 304 | Build/confirm campaign plan |
| 102 | PD32 | 302 | Update communications trategy |
| 102 | PD33 | | Deliver announcement/kickoff communication |
| 103 | PD4 | | Initialize transition management (design and development) |
| 103 | PD41 | | Create incentive/reward program |
| 103 | PD42 | | Assess supplier impacts related to transition management |
| 103 | PD43 | | Assess Enterprise support impacts related to transition management |
| 103 | PD44 | | Design detail go live material/activities |
| 103 | PD45 | 308 | Create policy changes |
| 103 | PD46 | | Identify/plan for security |
| 103 | PD47 | | Detail process transition plan |
| 103 | PD48 | 306 | Detail human resources plan |
| 103 | PD49 | | Detail employee relations plan |
| 104 | PD5 | | Ensure transition management activities (deploy) |
| 104 | PD51 | 350 | Ensure new process management system in place |
| 104 | PD52 | 222 | Perform client readiness assessment |
| 104 | PD53 | | Perform transition management go live activities |
| 104 | PD54 | 240 | Manage human resources activities |
| 105 | PD6 | | Communication (support) |
| 105 | PD61 | | Thanks to users/suppliers |
| 105 | PD7 | | Validate transition management (support) |
| 105 | PD71 | | Monitor human resource issues |
| 105 | PD72 | | Assess effectiveness of transition management program |
| 105 | PD8 | | Perform post implementation survey (support) |
| 105 | PD81 | 242 | Administer post go live survey |
| 105 | PD82 | | Present and act upon survey findings |
| | PE | NOT CATEGORIZED | |
| 104 | PE1 | 200 | Perform go live process activities |
| 104 | PE11 | | Allocate buyer codes to commodities |
| 104 | PE12 | | Enter blanket orders |
| ... | PE2 | | Table template document |
| ... | PE21 | | Table template document |

Project Assessment 101

Referring to FIG. 3 in connection with FIG. 2, project assessment phase 101 follows pre-sales phase 100, during which marketing makes its initial contact with the prospective client, or customer.

After initial contact from marketing 118, the main thrust of Assessment Project 101 is to provide an integrated, cross-functional customer solution to the client. An assessment team is led by the Business Office 120, but requires input and participation from the project leaders of Architecture 122, Transformation Management 136, Business Process 112, EDI 114, and Application Development 116.

Assessment 101 begins with a complete review of the client's current general procurement and accounts payable processes. This includes debriefing the initial marketing team 118, instructing the project leaders 126, and accumulating all other relevant data available about the client's processes, tools, and organizational structures. The Assessment Team then defines an integrated customer solution that covers technical, educational, and Human Resource issues.

The delivery of the Workshop is intended to present an overview of the customer solution, initiate discussions on process analysis and strategic implementation, and confirmation of the solution fit. Specific goals of a workshop phase within assessment stage 101 include the following:

(1) Prepare and deliver a presentation to the customer defining the service offering, including any essential documentation on the offering, and a demonstration of the end-user tool(s), as applicable.
(2) Collect area specific information and customer requirements on network process sourcing, procurement, accounts payable, and finance; and EDI, I/T, and transition management.
(3) Identify high level gaps in each such area.
(4) Identify additional high level requirements for new process support, and for conversion requirements, including requirements for commodity structure, account structure, vendor, and contracts.
(5) Identify interface requirements, including requirements for HR, cost center, catalogs, ledger, information warehouse.
(6) Validate accounting for project, appropriation, contract, job, tax reporting, currency, and check reconciliation.
(7) Identify requirements for network, EDI, testing, and application development including new reports, new interfaces, and new features.
(8) Assemble a high-level gap analysis.
(9) Create a high-level Customer Scope Document.
(10) Confirm the recommended solution.

At the completion of the workshop phase, the assessment team 106 convenes to develop and cost the final customer solution and proposal. At this time, the members of assessment team 106 assemble, understand, and validate the collected data; review standard proposal options with assumptions and identify items that apply to this client; create a draft of the proposal including scope, risk, schedule, and resources; review the draft with team and other project members to obtain sizing and costing information for each area; compile costing information to add to the proposal; and perform QA review of the system integration, application development, managed operations (including service delivery center (SDC), application IT, and Process Operations) proposals, and of the overall proposal.

The resulting proposal is delivered or presented to the client. Final Assessment activities include follow up query responses and, should the proposal be declined, a loss analysis. This loss analysis feeds back into assessment process 101 to improve its overall effectiveness and efficiency.

Referring to Table 4, summary tasks pertaining to assessment stage 101 are listed, together with included detail tasks. For each task, a template 440 or 520 is maintained in data base 70, and accessed by team 108 members and others through summary view 400 to track progress (including viewing, updating, sharing, and approving) during this assessment stage 101.

Project Preparation 102

Referring further to FIG. 3, project preparation stage 102 sets up the project, initializes detail planning, and models the plan for making the transition from the client's legacy system and process to the new system and process (or, offering).

A critical element of this stage is to ensure resources are assigned to transition management 136, both from the project implementation team 126 as well as from the client. During this stage the transition activities required for a smooth migration from the old client process and system to the new service offering are modeled. The result is a detailed transition management plan that is specifically designed for the client. Stage 102 tasks and deliverables include the following:

(1) Perform analysis on the client HR environment, including organization structure and relationships, labor relations, management, administration, and end user roles and responsibilities, and the general HR environment.
(2) Develop and approve the detailed transition management and communication plan.
(3) Update the client specific transition management strategy.
(4) Define the quality assurance (QA) process required to assure that a project conforms to documented standards and meets documented requirements. The purpose of this task is to confirm the quality assurance standards between Enterprise and the client, and identifies the tasks that are to be audited by the Enterprise Technical Center.

The QA review is a beneficial process for the project as it timely recognizes potential risk areas and reduces the possibility of project delays while achieving faster implementation, attaining low cost and increasing the customer's level of confidence. Deliverables of the QA review task include the following:

(1) Confirm and refine quality assurance standards with the customer.
(2) Confirm that technical requirements can be met.
(3) Confirm that business and financial measurements can be met.
(4) Confirm that the proposal is complete and the required processes have been followed.
(5) Establish QA schedule for the project.

Integration of all critical Enterprise and client team members provides the glue to assure a smooth project. By completing the detailed tasks within project preparation stage 102, the recommended implementation standards, procedures and strategies for the project are shared with the technical and business functional members of the project team as well as with the customer. All team members have input in this process, and understand the basic procedures, once they have been agreed to. These procedures, documented in summary and detail task templates listed in Table 4, include the following:

Configuration Standards
CR/PTR Process
Testing Strategy
Production Support and Operations Strategy
SAP System Management Strategy
Req/Cat System Management Strategy
Network Computing Strategy
Vendor Conversion Strategy

Project Design and Development 103

Referring further to FIG. 3, project design and development phase 103 provides and documents in a database of templates referred to as a Playbook, the business controls, transformation management, and SAP and Req/Cat customization required for an integrated approach to a complete customer solution.

During this stage 103, business controls 132 provides a comprehensive process that identifies key control points and establishes detailed procedures to assure a quality installation. The deliverables include documentation, separation of duties, sensitive programs, logical access control, logging (audit trail), change control for tables, change control for programs, system testing, input controls, processing controls, error handling controls, output controls, balancing and reconciliation, vital records and disaster recovery, records management, reports, local area network (LAN), and country specifics, as described below:

(1) Documentation: an assessment of the quality and completeness of existing program documentation and a determination of the degree to which programs could be efficiently reconstructed if they were destroyed.

(2) Separation of duties: the duties of the programmer, computer operations, and user groups are reviewed to ensure that separation of duties problems do not exist. No one individual can control activities within a process (or any event in a string of events) in a way that permits errors of omission, or commission of fraud, theft, etc., to go undetected.

(3) Sensitive programs: controls must be in place to prevent unauthorized modification and/or use of the application.

(4) Logical access control: while programs are generally controlled by a site procedure, application data has a formal access control mechanism.

(5) Logging (audit trail): a logging mechanism is established to ensure the audit trail is correct.

(6) Change control (tables): a change control system is put in place to evaluate, justify and control changes to tables.

(7) Change control (programs): a change control system is put in place to evaluate, justify and control changes to programs.

(8) System Testing: system testing procedures are effectively planned and carried out to ensure that controls are successfully tested and documented.

(9) Input controls: to insure accuracy and completeness of information entering an application.

(10) Processing controls: controls are applied for entry of data into the computer application system that ensure accuracy and completeness of data during computer processing.

(11) Error handling controls: controls for error handling and reprocessing of transactions.

(12) Output controls: output controls ensure the integrity of the output data from conclusion of computer processing to delivery to the user.

(13) Balancing and reconciliation: verifies that procedures to reconcile output to input are effective.

(14) Vital records and disaster recovery: disaster recovery is designed to provide for the continuity or rapid system restoration of a business process immediately following a natural or man-made emergency or disaster.

(15) Records management: verify that information is managed with sound business practices and controls.

(16) Reports: verify that reports are distributed properly.

(17) Local Area Network (LAN): Refer to ITCS 201, "Security Standards for Local Area Networks and Distributed Computing."

(18) Country specifics: verifies that any questions particular to this specific country are completed.

Req/Cat is a requisition and catalog product designed, developed, and maintained by Enterprise for use in systems such as those developed in this stage 103.

SAP is an financial and accounting package which an enterprise or company may license for its own use and for its customers. SAP configurators that customize package programs to fit the needs of the client are provided for use during design and development stage 103. All other installations of SAP are "off the shelf", with the client changing its internal structures to fit SAP requirements.

Transition management is the most overlooked part of any implementation process. It is critical to address the corporate culture and personality at the earliest contact. Strategic and tactical plans may then be developed that guide the implementation through "Go Live" and for an agreed period thereafter. The purpose of transition management steps of the design and development stage 103 is to provide guidance to the development team members as they work with the client to institute policy changes that might be introduced as part of the implementation of the new process and system. Necessary changes to the legacy system are identified and a plan developed to announce and introduce changes in policy. Policy change includes key business rules that are part of the management system for purchasing and procurement. They may be associated with approval levels or procedural changes in the new system. The target is not the day to day operation but management decision and support systems that might be affected. The areas addressed include:

Measurements (old and new)
Management system
Approval levels
Supplier contacts and contracts
Reward systems
Incentive Plans
Security
Employee and user changes All of these areas require strategic and tactical planning that includes the following steps:

(1) Identify the current (legacy) system or process and compare it to the new process or system to be implemented to identify gaps.

(2) Develop specific recommendations for gaps between the legacy and the new system or process, identifying the level of sensitivity and whether or not action is required as part of the transition.

(3) Determine the announcement and transition (or, cut over) date for each action identified.

(4) Design a communications plan to build the message and media for communicating the changes to affected parties.

(5) Design a process transition plan to ensure the elements of change are integrated into the overall plan for the process.

(6) Determine how the policies must be modified according to new standards and procedures (7) Determine what new policies and procedures will be implemented as part of the process and system.

Finally, integration of the above design and development stage 103 process steps along with the technical teams involved allow the delivery of a cross-functional solution under one unified and managed plan.

Project Deployment 104

Referring again to FIG. 3, project deployment phase 104 uses the Playbook to improve deployment of (1) quality, or application systems control and auditability (ASCA), (2) transition management, and (3) integrated project management systems and procedures.

1. Quality (ASCA)

A business controls team provides dedicated resources throughout the life cycle of the project. During the project development stage 103, this team has planned and executed an ASCA self-assessment that has covered an extensive list of technical, business, financial, and client issues. In this deployment stage 104, its members are responsible for managing an independent audit that will cover the same areas. The independent auditors then issue an acceptance position that is required before the client can "Go Live" with the new system and process. Deployment stage 104 activities include:

(1) Create the project plan for ASCA Review preparation activities.

(2) Determine which Enterprise organization will conduct the ASCA and business controls review.

(3) Prepare all ASCA documentation required for the review.

(4) Prepare all sub-process overviews and descriptions of process flow.
(5) Ensure the test plan includes those elements of the ASCA checks required to ensure business controls, separation of duties, and authorization matrices, data integrity and security.
(6) Create, update and complete all required documents of understanding (DOU's) & service level agreements (SLA's).
(7) Ensure the separation of duties matrix (SOD) is current at time of final review.
(8) Review all testing and obtain test approvals.
(9) Ensure all approvals have been obtained and signed approval forms available for ASCA Review. These include approvals for process ownership, ASCA requirements, self-assessment and system cutover.

2. Integrated Project Management

During this deployment stage 104, project manager 126 has the task to validate and confirm that all checklists and status are acceptable prior to Go-live. This includes the readiness of all aspects of the project, and once satisfied, a review is conducted and the customer's formal sign-off for Go-live is obtained. Status transition management and client readiness assessment and confirmation activities include verification that:
(1) No critical open issues exist in any area.
(2) All relevant aspects of readiness have been included in the status check.
(3) Network and computing performance testing is complete.
(4) System test is complete.
(5) User acceptance test is complete.
(6) System management production environment Go-live checklist is complete.
(7) Any needed CR's and PTR's have been generated.
(8) Production support is in place.
(9) Supplier readiness is reviewed and accepted.
(10) Service provider readiness is confirmed.
(11) Enterprise GP readiness is confirmed.
(12) Review of the compiled check information is completed.
(13) Customer sign-off on the Go-Live decision is obtained.

3. Transition Management

A transition management team prepares for the deployment, or "Go Live" of the client solution. During this deployment stage 104 in the project, virtually all technical problems are resolved and systems configured. The client is now ready to deploy and the human factors must be aggressively managed to assure a smooth transition from the legacy systems to the improved client solution. Transition management activities within deployment stage 104 ensure that organization, measurements, management, support, and labor relations functions are developed, explained, reviewed, understood, in place or on schedule, as appropriate.
(1) Organization: organizational changes for Go-Live, updated communications plans, feedback mechanism for persons displaced by changes in organization, and the new organization.
(2) Measurements: changes in measurement system, plan to cut over to the new measurements, and communications explaining the new measurements, including how they are derived, how they are used and their importance to the business.
(3) Management: changes in management or management responsibilities, communications explaining the changes in management structure, and why it is important to the clients' organization, the management chain and path for escalation of issues, normal business reports and their use.
(4) Support: support structure for both client and technical support.
(5) Labor Relations: activities associated with the loss of a job role, plan to notify the affected people, communication plan for providing information to remaining employees on the reasons for the changes and for fostering support for the new process.

Integration of the cross-functional teams to accomplish the deployment of the customer solution is facilitated by use of the system and data base structure of the preferred embodiment of the invention.

Ongoing Project Support 105

Referring further to FIG. 3, project support stage 105 enables project teams, all of which have continuing responsibilities with the client after "Go Live", to provide the required ongoing support. As with all other stages, integration of the teams through the use of the systems and methods provided by the invention, including transition management systems and methods, is greatly facilitated. It is a characteristic of the preferred embodiment that each of these areas has specific predetermined plans, actions and responsibilities, and these are audited and tracked through a GP/AP development and deployment system.

During support stage 105, transition management 136 delivers an approved detailed questionnaire with quality questions in a logical format that allows end-users to express their opinion and provide information that meets the survey objective. Support stage 105 includes a plan for communicating the survey results to the participants and taking action in response to the survey results. This stage also incorporates a continuing education plan for training new employees as well as continually updating the material so that reflects the latest version of the application.

The survey in stage 105 is structured to determine the end users' perception of the new system, system ease of use, response time from both the system and CSC (Customer Service Center), and customer knowledge level of processes and product. Results of the survey are compiled and presented to the client and Enterprise Management Teams along with action plans, time tables, expected results for approval, and implementation. A Lessons Learned document is reviewed with the project team and appropriate adjustments made for future engagements.

Project Manager 126 provides a quality function task after "Go Live". This task aims at checking the implementation of the EPS Offering to determine if anything needs special attention or focus. It is also the formal sign-off on the final delivery of the implementation by the customer. Its deliverables include:
(1) Customer accepts delivery of the EPS general procurement offering implementation and signs off.
(2) Action list on issues and CR/PTR's, if applicable.
(3) Formal transition of operational responsibility to operations 98 and support management 96.
(4) Preliminary business benefits evaluation.

The Req/Cat and SAP technical teams 128, 138 provide ongoing reviews and improvements to the client's process through the CR and PTR processes. These are formalized, documented processes with management controls to attain cost, schedule, and customer objectives.

As part of the new business process, support center 94 is established to provide long term assistance in any area of the application solution. This includes communication of feedback, real time application assistance, and special requests for problems concerning data.

It is the planned integration of these multi-functional teams that provides an innovative solution to the customer.

Representative Implementation of Ongoing Support Stage 105

Figure 3E:
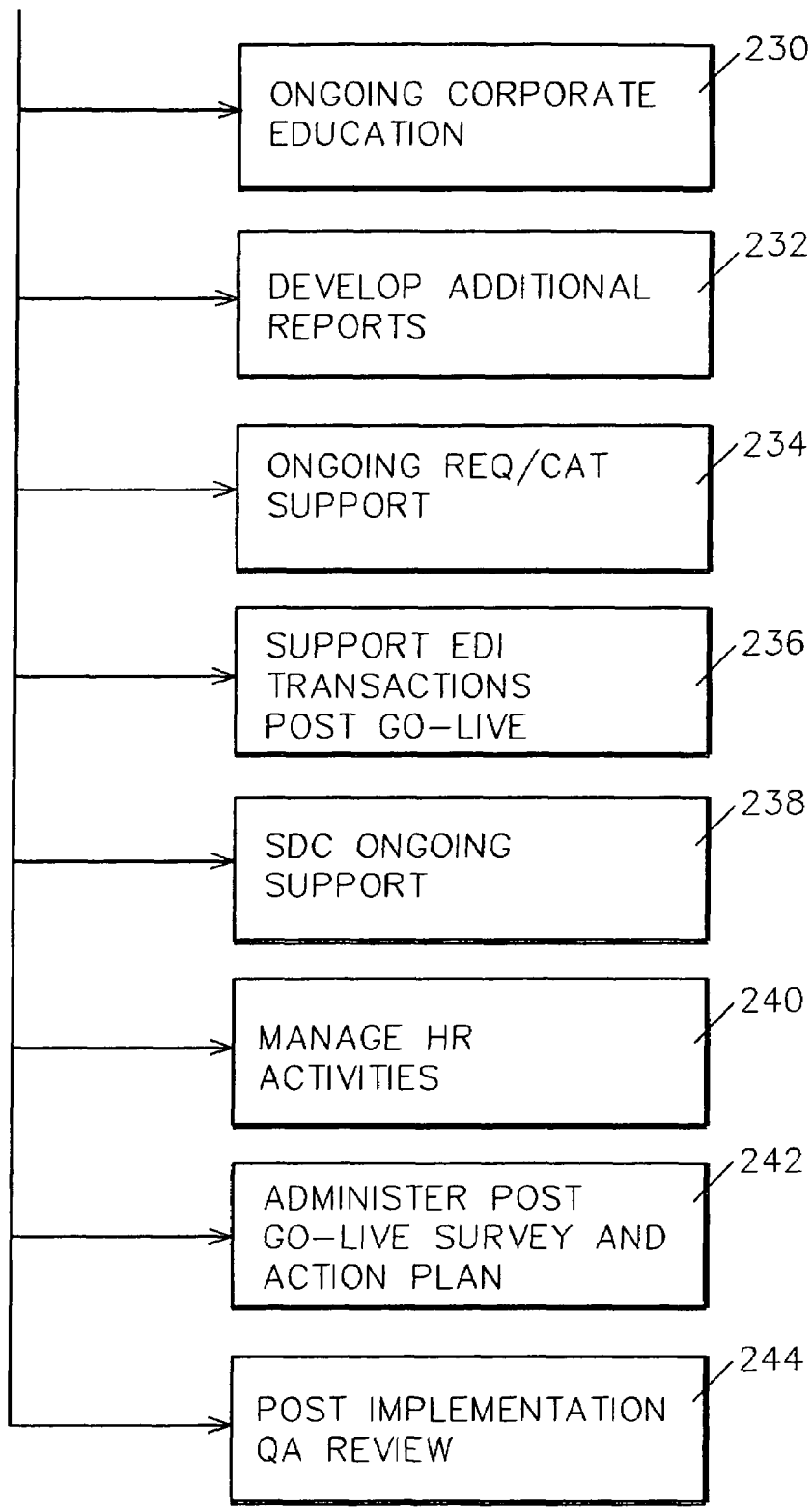
Figure 3F:
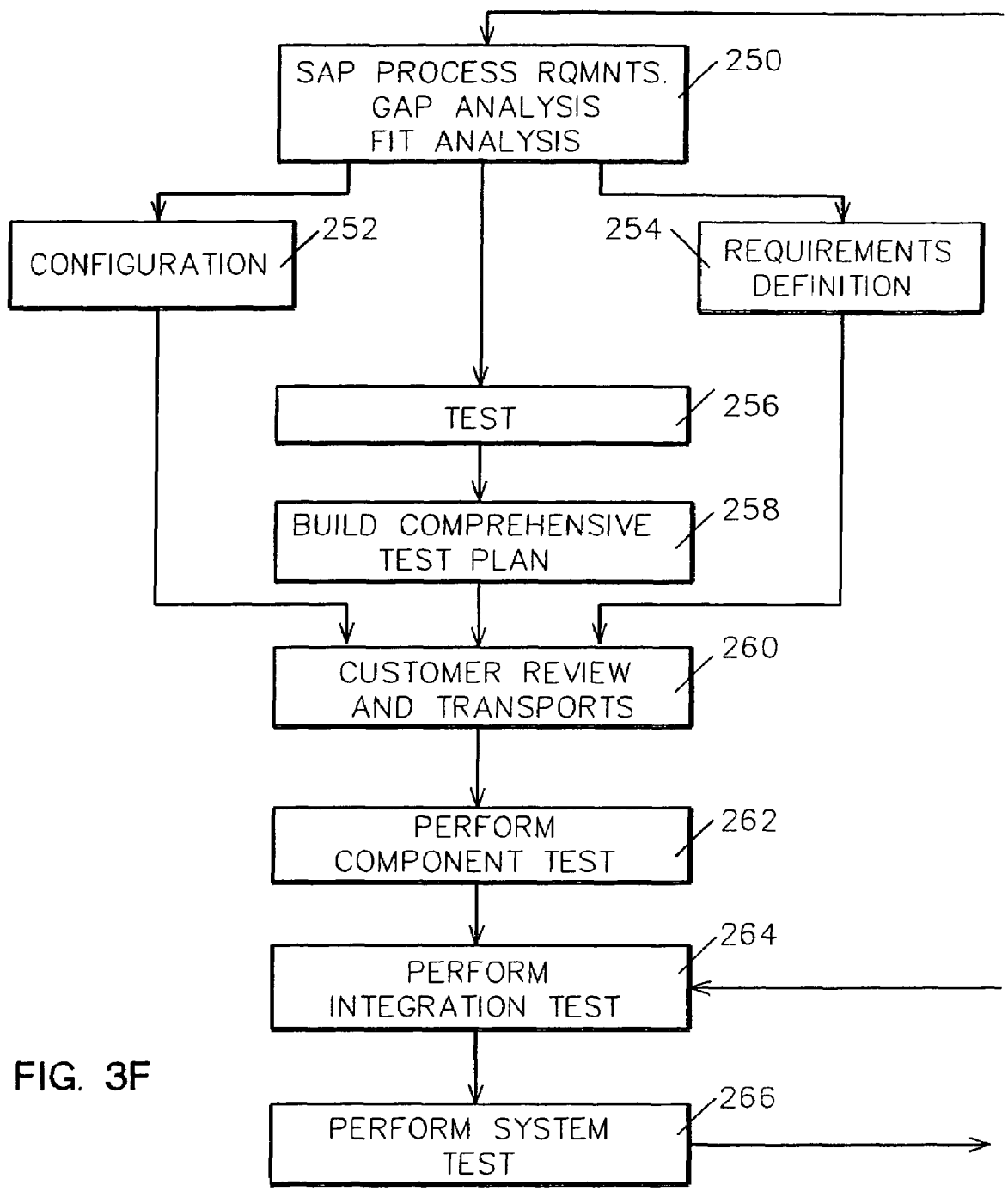
Figure 3G:
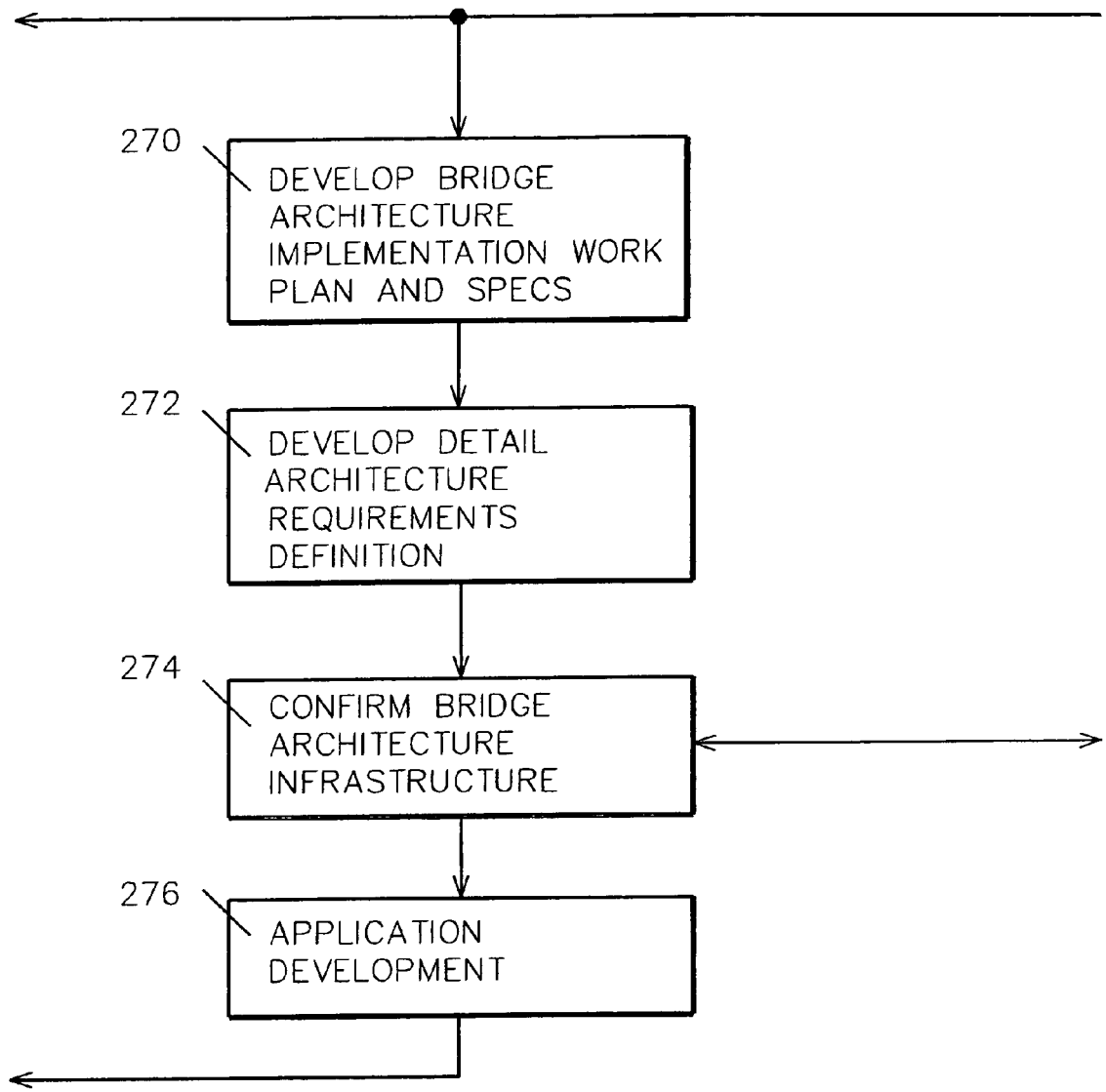
Figure 3H:
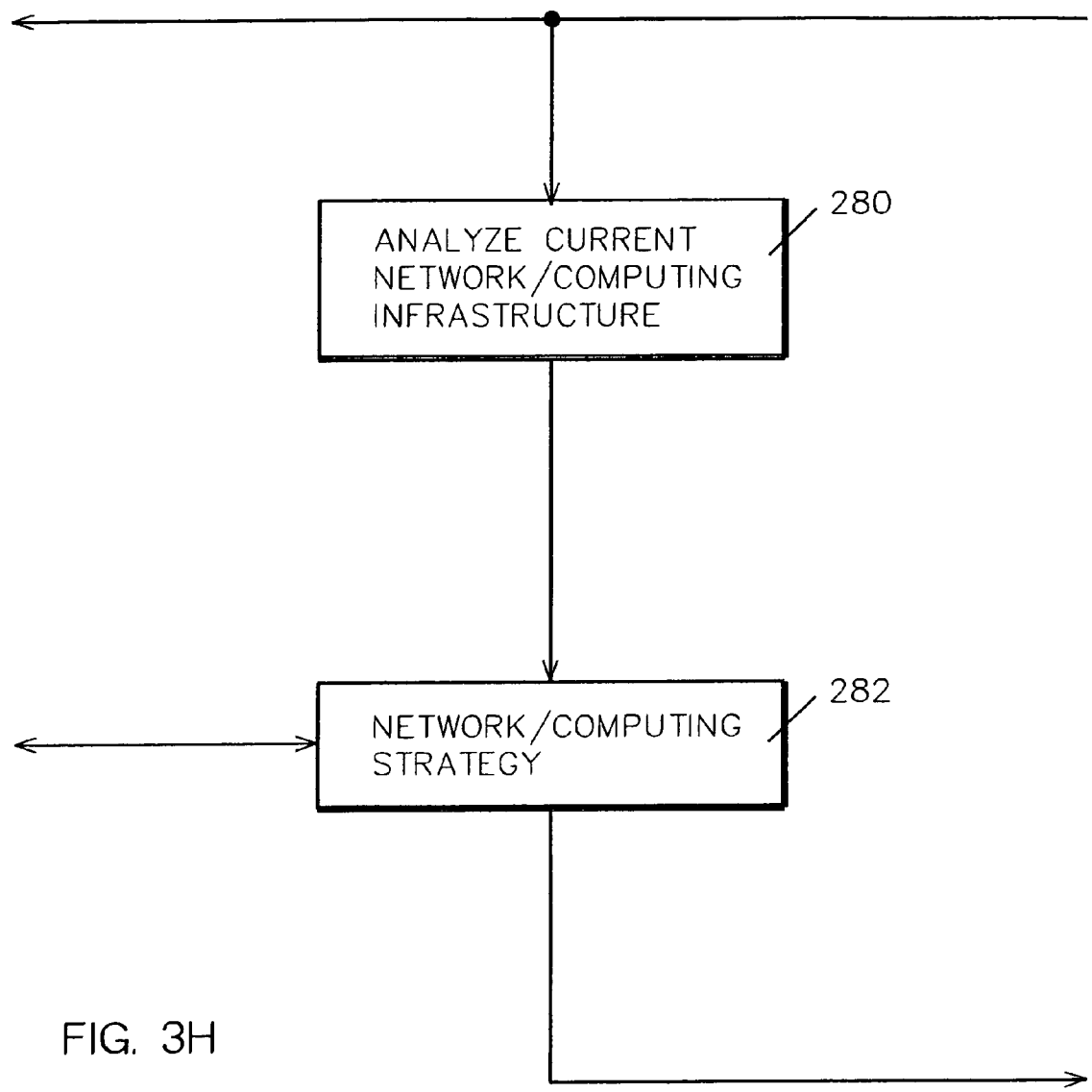
Figure 3J:
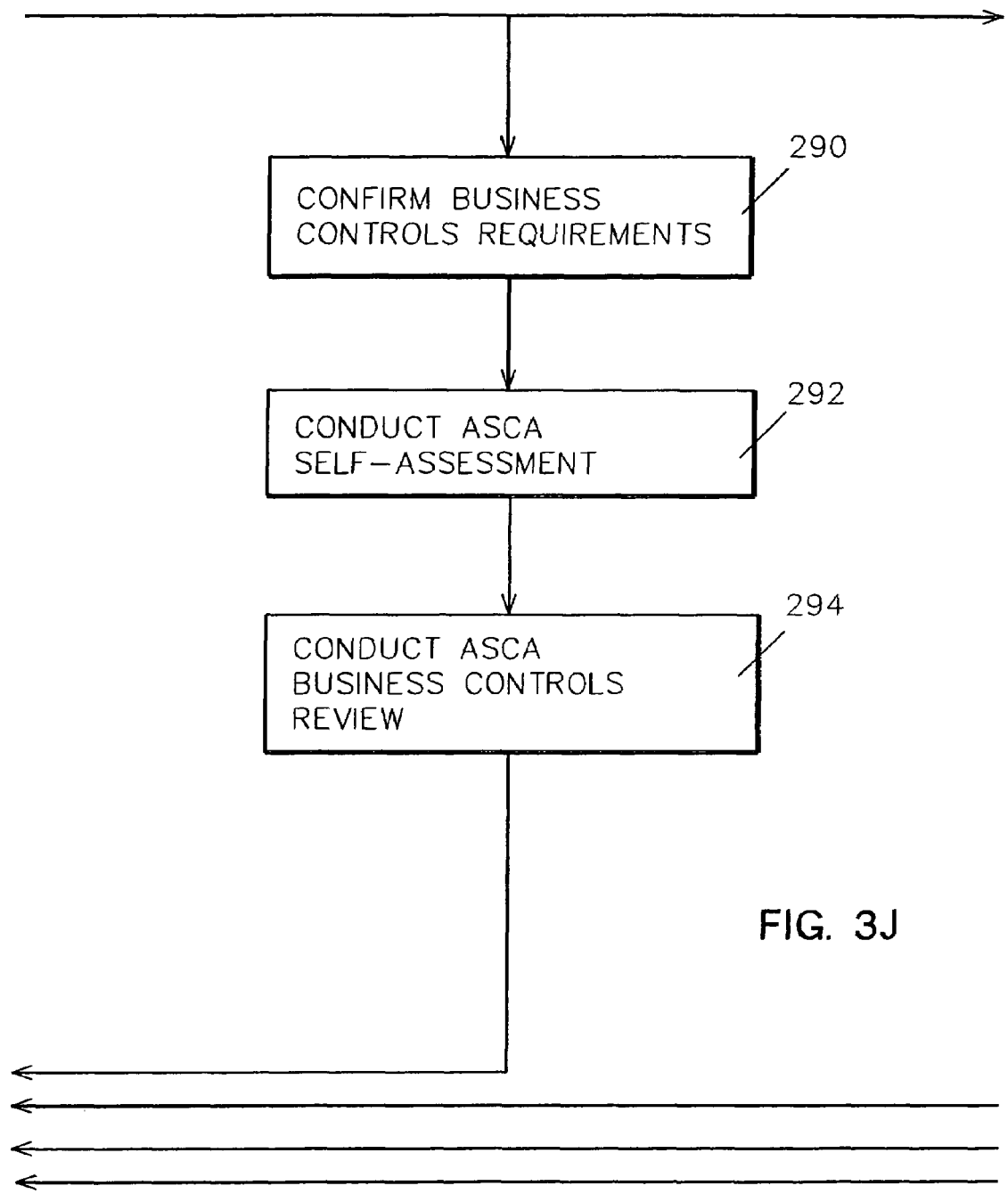
Figure 3K:
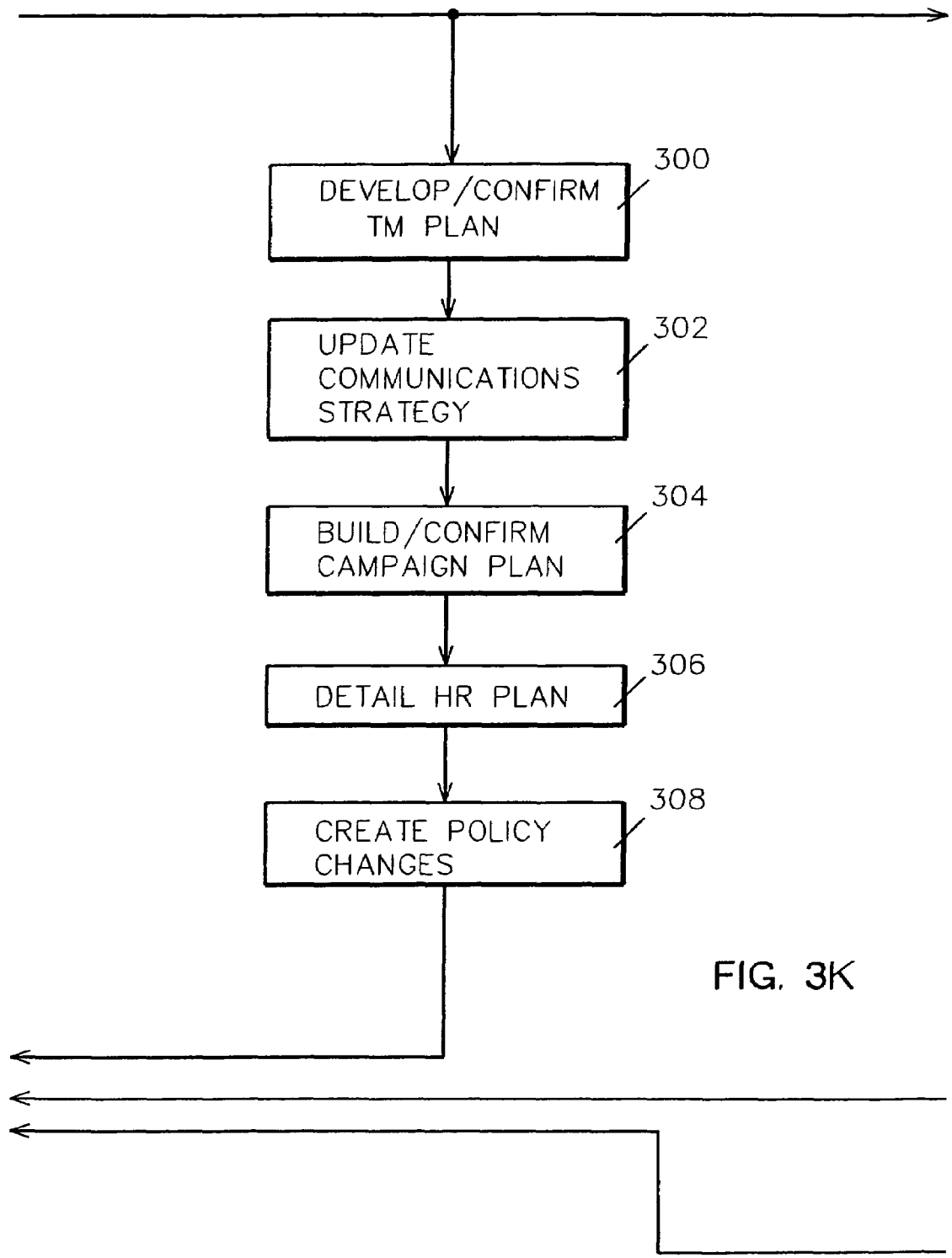
Figure 3L:
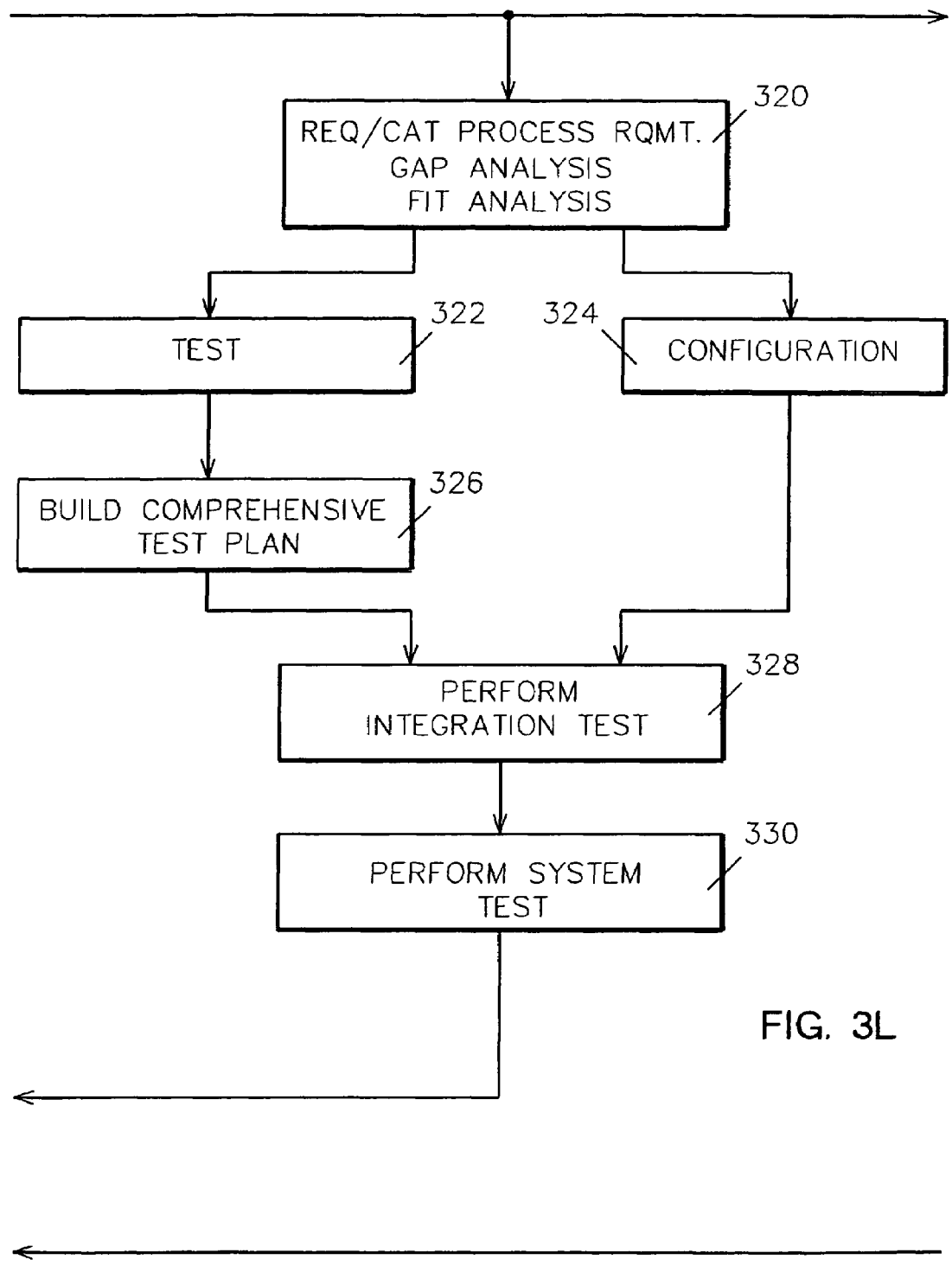
Figure 3M:
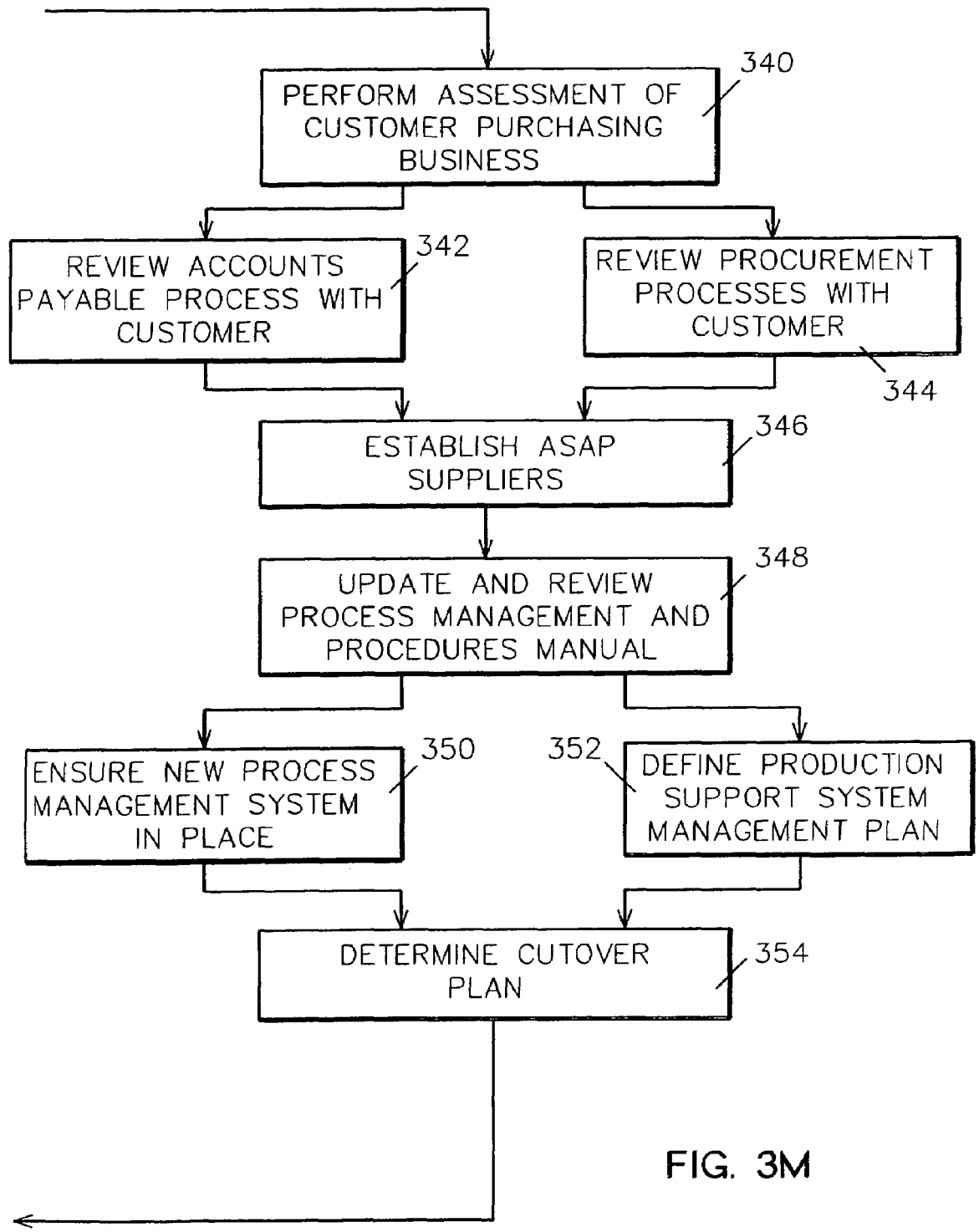

Referring to FIG. 3E, a series of steps illustrating an exemplary selection of tasks in ongoing support stage 105 will be described.

While steps 230-244 represent a selection of key steps in stage 104, other summary and detail tasks designated in Table 4 as pertaining to stage 104 are typically included in the initial set of templates for this customer, and are also used as they are determined to be applicable. Some field entries are dynamic and changeable during the course of ongoing support stage 105. The templates are also editable for a particular project, and do not necessarily continue during use to conform to the original format.

In step 230, ongoing training, similar to that of step 214, is provided. Education material is supplied and maintained to the latest version of Req/Cat to the client. this is distributed using distance learning techniques.

In step 232, the data warehouse team accesses detail task template P633 in the course of developing additional reports. Task P633 is originally executed in stage 103, and is also applicable to on-going support stage 105. This task describes the steps necessary to complete in stage 103 the development required to support the Operational Reporting needs during on-going support stage 105. Template P633, Table 27, provides, either directly or by way of links to other documents, instructions, flow charts, sample questionnaires, report models and checklists for guiding, coordinating and documenting the work of the data warehouse team.

TABLE 27

DETAIL TASK: DEVELOP ADDITIONAL REPORTS

CREATION STATUS

| | |
|---|---|
| Category: | I/T |
| Team: | Data warehouse |
| Offering type: | Req/Cat, SAP, Req/Cat&SAP |
| Stage: | 3. Design & Development |

IMPORTANCE BUTTONS

| | |
|---|---|
| Education: | No |
| Certification: | Yes |
| Auditable: | Yes |
| Critical path: | Yes |

IMPLEMENTATION

| | |
|---|---|
| Executed by: | Service provider |
| Performed by: | Customer, reporting analyst |
| Priority: | High |
| Work effort: | 15 days |
| Sequence: | 3 months prior |

DETAIL TASK DETAILS

Description:

This task describes the steps necessary to complete development required to support the Operational Reporting needs. This task will use the CR's identified in the Analyze Operational Reporting Requirements detail task from the Project Preparation stage. Detail requirements will be realized and resolutions will be researched, defined, documented and agreed on by the customer, Operations team and the Reporting implementation team members.

TABLE 27-continued

DETAIL TASK: DEVELOP ADDITIONAL REPORTS

Prerequisites:

Gaps must have been documented on a CR form(s) and initiated in the Analyze Operational Reporting Requirements detail task in the Project Preparation stage
Task steps:

1. Perform Required Development - Review the CR form, update the form with additional development requirements (if required). For the CR's assigned to the Reporting team, complete necessary actions for development of these:
Develop Reports
Update Reporting Tree
Update Report List Document
2. Interlock with AD Team - For the CR's assigned to the SAP AD team review requirements with team and discuss development methods.
3. Interlock with Image Team - For the CR's assigned to the Image AD team, review requirements with team and discuss development methods.
4. Unit Test - All reports developed via CR must be unit tested prior to transporting the code to the Test environment.
Unit test Reporting team development
   Document test results
   Obtain customer sign off on unit test
Participate in SAP AD team development
   Review documented test results
   Sign off on successful testing
Participate in Image AD team development
   Review documented test result
   Sign off on successful testing
5. Submit Transport - Once unit testing has been completed and signed off, the code must be moved into the Test system for formal System, User and Integration testing responsible for own transports and coordinate any AD involvement).
Ensure all transports exist
Submit transport to target system
Verify transport successful
6. Support Testing Process - It is necessary to be available to provide explanations of development or to answer questions regarding any subsequent changes identified via a problem log (PTR).
Obtain sign off from Test team
Ensure transport to Production system has been initiated
7. Update Reporting Document - Update all relevant documents. Update the document with the changes and additions in fields, values, reports, etc. (i.e. BPMGP)
Update the standard list/golden list of reports
8. Train Customer - If training is required for the operations team on the additional reporting specifications the following should be considered.
Update training material
Schedule training with Operations
Perform necessary training
9. Update Reporting Project Plan - The Reporting Team project plan should be updated accordingly with new development work, dates and detail required to complete this task.
Deliverables:

Development Documentation Supporting New/Changes to Reporting Code
Updated CR Form
Unit Test Results
Transport Request to Test System
Test Team Sign Off
Updated Report Instruction Document (if required)
Reporting Team Project Plan
Methodology attachments:

The following document links contain the attachments necessary to complete this task:
Sample Development Documentation Supporting New/Changes to Reporting Code   =>
Report Instruction Document   =>
Sample DataMart Decision Point Matrix   =>

TABLE 27-continued

DETAIL TASK: DEVELOP ADDITIONAL REPORTS

PROJECT REFERENCE AREA

Comments & Dialog:
Step Checklist:

1. Perform required development - update CR form.
2. Interlock with SAP AD team - describe reporting requirements.
3. Unit test - document test results.
4. Submit transport to test system.
5. Support testing process - obtain sign off on successful test.
6. Update report instruction document.
7. Train operations team.
8. Develop reporting project plan.

In step 234, the Req/Cat team accesses detail task template P691, Table 28, in the course of providing ongoing Req/Cat support. After the Req/Cat system has Gone Live, the system is monitored any production problems that occurred solved. Template P691 provides, either directly or by way of links to other documents, instructions, flow charts, sample questionnaires, report models and checklists for guiding, coordinating and documenting the work of the Req/Cat team through the task.

TABLE 28

DETAIL TASK: PERFORM ON-GOING SUPPORT ACTIVITIES FOR REQ/CAT

CREATION STATUS

| | |
|---|---|
| Category: | Req/Cat |
| Team: | Req/Cat |
| Offering type: | Req/Cat, SAP, Req/Cat&SAP |
| Stage: | 5. Ongoing support |

IMPORTANCE BUTTONS

| | |
|---|---|
| Education: | Yes |
| Certification: | No |
| Auditable: | Yes |
| Critical path: | No |

IMPLEMENTATION

| | |
|---|---|
| Task order: | 1 |
| Executed by: | Service provider |
| Performed by: | Req/Cat Admin |
| Priority: | Medium |
| Sequence: | One day after |

DETAIL TASK DETAILS

Description:

After the Req/Cat system has Gone Live, you will need to have people allocated to monitor the System and solve any production problems that occurred. Generally, the Global and Country administrators will be responsible for the daily monitoring of the Req/Cat table information and the feed of data through the Req/Cat tables.
Prerequisites:

The Req/Cat system has Gone Live
The Post Production Support structure/process has been implemented
Task steps:

Daily, the Country and Global administrators will need to monitor the Req/Cat Production system to identify errors, analyze the cause, and determine the resolution path. To monitor the system, you will need to look in the systems logs and the bridge ID's e-mail. There will be times when the CA or GA can fix the problems themselves and other times when a CR or PTR will need to be raised.

TABLE 28-continued

DETAIL TASK: PERFORM ON-GOING SUPPORT ACTIVITIES FOR REQ/CAT

Refer to the attachment Req/Cat Production Support Procedures for a complete description of the ongoing support procedures for Req/cat.
Daily, the CA and GA will need to maintain the catalogs, HR feeds, cost centers fields, and country table information. Generally, the most errors will occur with the HR and Cost Center feeds.
In additional the table monitoring tasks, the support people will need to look at how the process are working and identify and concerns or suggestions for improvements.
The CA and GA will also need to work closely with the Customer Service Center (Help Desk) to answer questions they may have to serve as the second point of contact for issues or questions that are raised by callers. Obviously, the SCS/Help desk will attempt to answer all questions first, but there will be problems or questions where the will need assistance for resolution.
For the first few weeks after production cut over, there should be daily support team meeting to identify major problems, concerns, etc. The CA and GA should attends these meetings and actively participate in the discussions and resolution process.
Any open issues or unresolved problems should be addressed to the Production Support Leader and escalated if they are not solved within a reasonable amount of time.
Deliverables:

A Req/Cat production support structure with defined procedures and roles.
Methodology attachments:

Req/Cat Production Support Procedures ->

In step 236, the EDI team accesses detail task templates P694 (Table 29) and P697 (Table 30) in the course of supporting EDI transactions post go live. These tasks cover data management, help desk support procedures, report generation, and security. Templates P694 and P697 provide, either directly or by way of links to other documents, instructions, flow charts, sample questionnaires, report models and checklists for guiding, coordinating and documenting the work of the EDI team through the steps of these tasks.

TABLE 29

DETAIL TASK: SUPPORT NEW EDI TRANSACTIONS POST GO LIVE

CREATION STATUS

| | |
|---|---|
| Category: | I/T |
| Team: | EDI |
| Offering type: | Req/Cat, SAP, Req/Cat&SAP |
| Stage: | 5. Support |

IMPORTANCE BUTTONS

| | |
|---|---|
| Education: | Yes |
| Certification: | Yes |
| Auditable: | Yes |
| Critical path: | No |

IMPLEMENTATION

| | |
|---|---|
| Executed by: | Service provider |
| Performed by: | EDI specialist |
| Priority: | Medium |
| Work effort: | 30 days |
| Sequence: | One month after |

DETAIL TASK DETAILS

Description:

The customer may choose to add additional transactions once the selected service offering has been implemented. The following EDI transactions are standard and are most often added after the TABLE 29-continued

DETAIL TASK: SUPPORT NEW EDI TRANSACTIONS POST GO LIVE customer goes live to meet additional requirements:
840 - RFQ
843 - Response to 840
832 - Price/Sales Catalog
856 - Ship Notice/Manifest
For non-standard transactions the same steps should be followed, however a CR will need to be created, bid and approved through the CR Process Flow before the additional work can be done.
Prerequisites:

Customer must be using EDI in a production environment for the selected service offering.
Task steps:

1. Confirm customers current EDI Infrastructure - Review the project documentation that specifies EDI infrastructure for customer
2. Define New Requirements - Meet with the customer to define new requirements and transaction needed for the Production environment, compare requirements to Golden IDOC for transaction Analyze customer requirements
   Transactions
   IDOC's
   Data Fields
     Required
     Optional
3. Create Trading Partner Transaction Map - For each ANSI X.12 transaction selected, independent of how many trading partners exist
4. Interlock with Req/Cat and SAP units of measure - To ensure integrity of order of data
ANSI standards
5. Interlock with Trading Partners - Communicate all customer specific requirements for new transaction to trading partners
Define Media
   Letter
   Meeting/Forum
   Web Page
Convey business strategy for new transaction
6. Identify Trading Partner Issues - All issues from the interlock with trading partners must be documented and presented to the customer for a decision
7. Unit Test - Once system communication has been established follow the test check list to complete the unit test
Verify Mapping
Test JCL
Add to Job Stream
Document Test Results
8. Move To Production Environment - Once all testing has been completed successfully and customer sign off has been obtained schedule move into Production, follow EDI Go Live Check List
Deliverables:

New Requirements for EDI Transactions documented
Communication to Trading Partners regarding new transaction requirements
Trading Partner Transaction Map
Unit Test Results
New Transaction(s) Moved to Production Systems
Methodology attachments:

The following document links include all necessary attachments to complete this task:
Web Page Link   =>
EDI Checklist   =>
EDI TP Package   =>
           PROJECT REFERENCE AREA Comments & Dialog:
Step Completion Tracking Checklist:

1. Confirm customers current EDI infrastructure.
2. Define new requirements.
3. Create trading partner transaction map.
4. Interlock with Req/Cat and SAP units of measure.
5. Interlock with trading partners.

TABLE 29-continued

DETAIL TASK: SUPPORT NEW EDI TRANSACTIONS POST GO LIVE

6. Identify trading partner issues.
7. Unit test.

TABLE 30

DETAIL TASK: EXECUTE EDI SUPPORT PROCEDURES

CREATION STATUS

Category:   I/T
Team:   System Management
Offering type:   Req/Cat, SAP, Req/Cat&SAP
Stage:   5. Support
         IMPORTANCE BUTTONS Education:   Yes
Certification:   Yes
Auditable:   Yes
Critical path:   No
         IMPLEMENTATION Executed by:   Service provider
Performed by:   EDI specialist
Priority:   Medium
Sequence:   Ongoing support
         DETAIL TASK DETAILS Description:

This task provides the steps, attachments and desk procedures required to support the EDI process in a Production environment.
Task steps:

1. Maintain and Follow EDI Setup Procedures (GP):
Inbound
Outbound
Test
CPS North Production
CPS Test
2. Maintain and Follow Web EDI Setup:
Analysis:
Deliverables:

EDI Support Maintenance Desk Procedures
Methodology attachments:

The following doclink will provide the attachments necessary to complete this task =>
EDI Setup Procedures:

Inbound
Outbound
Test
CPS North Production
CPS Test
Web EDI Setup:
         PROJECT REFERENCE AREA Step Checklist:

Use the following table to track the completion of each step:
1. Maintain/follow EDI setup procedures.
2. Maintain/follow EDI web setup procedures.
Approval status:
Edit history:

In step 238, service delivery center (SDC) ongoing support, help desk functions that are supplied to the client through time. This covers problem reporting, new requests for reports, education questions, and so forth.

In step 240, the transition management team accesses detail task template PD54, Table 31, in the course of insuring that the human resources aspects of the transition plan are in place and in progress. Specifically, this step deals with organizational impacts, changes in roles and responsibilities, labor relations, bonuses and incentives, meetings, feedback and comments. During this step, the auditors check to see the plan is being executed properly. Template PD54 provides, either directly or by way of links to other documents, instructions, flow charts, sample questionnaires, report models and checklists for guiding, coordinating and documenting the work of the transition management team through the steps of this task during deployment and ongoing support stages 104 and 105.

TABLE 31

DETAIL TASK: MANAGE HUMAN RESOURCES ACTIVITIES

CREATION STATUS

| Category: | Transition Management |
|---|---|
| Team: | Transition Management |
| Offering type: | Req/Cat, SAP, Req/Cat&SAP |
| Stage: | 4. Deploy |

IMPORTANCE BUTTONS

| Education: | Yes |
|---|---|
| Certification: | Yes |
| Auditable: | Yes |
| Critical path: | No |

IMPLEMENTATION

| Executed by: | Service provider |
|---|---|
| Performed by: | Transition manager |

DETAIL TASK DETAILS

Description:

This step specifically focuses on the Human Resources aspects of the transition and is intended to insure the elements of the transition plan that focus on this area are in place and in progress. During this detail task, you will be assessing and ensuring the steps in the plan are being implemented and the transition is moving forward from an HR perspective. Specifically, this step will deal with the following areas.
Organizational impacts
Changes in roles and responsibilities
Labor relations
Bonuses/Incentives
Meetings/Feedback/Comments
Earlier the client was assessed as to the impact of the transition on these areas. A plan was developed to respond to the issues related to HR and built in the transition plan. During this step, you will check to see the plan is being executed
While it is the responsibility of the Transition Management coordinator at the Enterprise/Service Provider project to ensure these tasks are completed, the client HR department must play a strong role to ensure the actions required of the client are carried out
In general, issues and concerns identified will be handled with the right communications and training for those affected. However, there may be cases where actions need to be taken that is specific to a particular problem. This is particularly true where jobs are either eliminated or added.
Prerequisites:

Ensure a clear understanding of the client various HR worksheets and the analysis of the sheets as part of the development of the transition plan.
Go-live is completed and the system/process has been successfully implemented.
Deliverables:

Updated input to the client Transition Management Plan, only as needed.
Any required announcement material
Customized Presentations for Meetings TABLE 31-continued

DETAIL TASK: MANAGE HUMAN RESOURCES ACTIVITIES

Methodology attachments:

Organization Announcement Presentation ->
PROJECT REFERENCE AREA

Step Status Checklist:

| Step | Status |
|---|---|
| 1. Ensure steps are in progress to move toward any changes in organization that are part of the transition. | |
| 2. Ensure any changes in organizational communications or relationships are in progress. | |
| 3. Ensure changes in individual job roles and responsibilities for managers/administration/ process end users | |
| 4. Ensure activities associated with the loss of a job role are in place | |
| For any activities directly related to labor unions see next step document | |
| 5. Make sure the new measurements (if any) are in place and understood by those affected by the change. Ensure the transition to the new measurement system is on tract and any measurement that will affect peoples performance evaluation are understood and working properly. Ensure normal business reporting is working and those receiving the reports understand each report AND what they should be doing with each report. Ensure the transition to the new measurement system is on track and any reports or measurements that will affect employee bonus plans are understood and working properly. | |
| 6. Review the transition management plan for all elements associated with HR and HR impacts and ensure they are on track for completion by general cut over date. | |
| 7. Ensure the action plans identified are provided as input and are included as an attachment that updates the final Transition Management Plan for the client. | |
| 8. Ensure user meetings are scheduled. Review initial communications plan to ensure that no changes are necessary to the base plan. After the meetings, provide a mechanism for feedback and comments. | |
| Approval status: | |
| Edit history: | |

In step 242, the transition management team accesses detail task template PD81 in the course of distributing and analyzing a survey questionnaire and preparing action plans for implementation by management. Template PD81 provides, either directly or by way of links to other documents, instructions, flow charts, sample questionnaires, report models and checklists for guiding, coordinating and documenting the work of the transition management team through the steps of the task.

In step 244, the project office team accesses summary task P9C and its subsidiary tasks in the course of providing post implementation QA review. Template P9C provides, either directly or by way of links to other documents, instructions, flow charts, sample questionnaires, report models and checklists for guiding, coordinating and documenting the work of the project office team through the steps of the task.

Advantages Over the Prior Art

It is an advantage of the invention that there is provided a system and method for evaluating a client's general procurement and accounts payable (GP/AP) system.

It is an advantage of the invention that there is provided an optimized solution for out-sourcing procurement of goods and services.

It is an advantage of the invention that there is provided a system and method for training service providers.

It is an advantage of the invention that there is provided a system and method for managing service providers to assure quality of service.

It is an advantage of the invention that there is provided a system and method for managing a project.

It is an advantage of the invention that there is provided an optimized general procurement and accounts payable system characterized by lower costs, a paperless process, and more comprehensive service with a shorter cycle time.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as optical wire, tape or disc, or the like, for storing information readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A program storage device readable by a machine, tangibly embodying a program of instructions executable by a machine to perform a method using an on-line data gathering tool for evaluating and on-going supporting a general procurement and accounts payable system of a customer, said method comprising:

said machine maintaining a playbook database, said playbook database comprising a plurality of templates of information relating to said evaluating said general procurement and accounts payable system, said plurality of templates being particularized for said customer;

said machine displaying a playbook summary view, said playbook summary view comprising a folders and views section, a task title display and selection area, a summary task creation button, and a detailed task creation button, said folders and views section including category buttons that, when selected, cause execution of tasks associated with said evaluating and on-going supporting said general procurement and accounts payable system for said customer, said tasks including gathering data describing requirements of said customer for procurement and data describing currently used tools and processes for satisfying said requirements; and gathering data from said customer which describes a cost for future years of continuing with said currently used tools and processes;

designing and deploying a new system including alternative tools and processes satisfying said requirements; and thereafter auditing an operation of said new system using said on-line data gathering tool to provide performance data to said customer;

said task title display and selection area adapted to include buttons for selecting tasks pertinent to categories of said tasks, said buttons for selecting tasks identifying said tasks which may be so selected, said buttons for selecting tasks adapted to be displayed in said task title display and selection area in response to a selection of a button of the category buttons;

said machine displaying a summary task template of said plurality of templates for a selected first task of tasks identified in said task title display and selection area, said summary task template being displayed in response to a selection of said summary task creation button, said summary task template including summary parameters of said selected first task; and said machine displaying a detailed task template of said plurality of templates for a selected second task of tasks identified in said task title display and selection area, said detailed task template being displayed in response to a selection of said detailed task creation button, said detailed task template including detailed parameters of said selected second task.

2. A program storage device readable by a machine, tangibly embodying a program of instructions executable by a machine to perform a method using an on-line data gathering tool by third party service providers for evaluating and on-going supporting a general procurement and accounts payable system of a customer and for adapting a general procurement and accounts payable application to requirements of each of many potential customers operable and for an enterprise to monitor a quality of services provided by said third party service providers, said method comprising:

said machine maintaining a playbook database, said playbook database comprising a plurality of templates of information relating to said evaluating said general procurement and accounts payable system, said plurality of templates being particularized for said customer by said third party service provider;

said machine displaying to said third party service provider a playbook summary view, said playbook summary view comprising a folders and views section, a task title display and selection area, a summary task creation button, and a detailed task creation button, said folders and views section including category buttons that, when selected, cause execution of tasks associated with said evaluating and on-going supporting said general procurement and accounts payable system for said customer, said tasks including gathering data describing requirements of said customer for procurement and data describing currently used tools and processes for satisfying said requirements;

gathering data from said customer which describes a cost for future years of continuing with said currently used tools and processes;

designing and deploying a new system including alternative tools and processes satisfying said requirements; and thereafter auditing an operation of said new system using said on-line data gathering tool to provide performance data to said customer and to said enterprise;

said task title display and selection area adapted to include buttons for selecting tasks pertinent to categories of said tasks, said buttons for selecting tasks identifying said tasks which may be so selected, said buttons for selecting tasks adapted to be displayed in said task title display and selection area in response to a selection of a button of the category buttons;

said machine displaying a summary task template of said plurality of templates for a selected first task of tasks identified in said task title display and selection area, said summary task template being displayed in response to a selection of said summary task creation button, said summary task template including summary parameters of said selected first task; and said machine displaying a detailed task template of said plurality of templates for a selected second task of tasks identified in said task title display and selection area, said detailed task template being displayed in response to a selection of said detailed task creation button, said detailed task template including detailed parameters of said selected second task.

* * * * *